(12) United States Patent
Gass et al.

(10) Patent No.: US 7,845,258 B2
(45) Date of Patent: Dec. 7, 2010

(54) BRAKE CARTRIDGES FOR POWER EQUIPMENT

(75) Inventors: Stephen F. Gass, Wilsonville, OR (US);
J. David Fulmer, Tualatin, OR (US);
David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 12/079,820

(22) Filed: Mar. 27, 2008

(65) Prior Publication Data
US 2008/0184857 A1   Aug. 7, 2008

Related U.S. Application Data

(62) Division of application No. 10/923,273, filed on Aug. 20, 2004, now Pat. No. 7,350,445.

(60) Provisional application No. 60/496,574, filed on Aug. 20, 2003.

(51) Int. Cl.
*B26B 5/00* (2006.01)
*B27B 3/28* (2006.01)

(52) U.S. Cl. .................. 83/58; 83/62.1; 83/477.2; 83/477.1; 83/581; 83/DIG. 1; 83/490

(58) Field of Classification Search .............. 83/62.1, 83/DIG. 1, 477.2, 522.12, 581, 72, 76.7, 83/478, 461.5, 473, 477.1, 481, 487–490, 83/574, 821, 823, 827, 829, 665, 666, 954, 83/397.1; 451/451, 1, 6, 9, 119, 158, 177; 307/326; 283/74; 188/73.31, 300, 367, 156, 188/242, DIG. 1, 73.34; 340/530, 590, 680; 403/2, 28; 144/384, 391, 427, 154, 356
See application file for complete search history.

(56) References Cited

U.S. PATENT DOCUMENTS

| 4,453,112 | A |   | 6/1984 | Sauer et al. |
| 4,617,544 | A |   | 10/1986 | Mooz et al. |
| 5,510,884 | A | * | 4/1996 | Bov et al. .................. 399/120 |
| 5,666,586 | A | * | 9/1997 | Nishimura et al. ............ 399/13 |
| 6,133,818 | A |   | 10/2000 | Hsieh et al. |
| 6,430,007 | B1 |  | 8/2002 | Jabbari |

(Continued)

FOREIGN PATENT DOCUMENTS

DE          2917497          4/1979

(Continued)

OTHER PUBLICATIONS

Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.

(Continued)

*Primary Examiner*—Ghassem Alie

(57) ABSTRACT

Safety systems for power equipment and components and brake cartridges for use in those safety systems are disclosed. The safety systems, components and brake cartridges are specifically applicable for woodworking equipment such as saws. An exemplary brake cartridge includes a housing and a braking component configured to engage a moving part of the power tool upon occurrence of a predetermined event. The brake cartridge may further include a switch configured so that proper installation of the cartridge in the power tool triggers the switch.

4 Claims, 28 Drawing Sheets

U.S. PATENT DOCUMENTS

| | | | |
|---|---|---|---|
| 6,857,345 | B2 | 2/2005 | Gass et al. |
| 6,922,153 | B2 | 7/2005 | Pierga et al. |
| 2002/0020261 | A1* | 2/2002 | Gass et al. ............... 83/58 |
| 2002/0050714 | A1 | 5/2002 | Imai et al. |
| 2002/0170399 | A1 | 11/2002 | Gass et al. |
| 2003/0019341 | A1 | 1/2003 | Gass et al. |
| 2003/0020336 | A1 | 1/2003 | Gass et al. |
| 2004/0060404 | A1 | 4/2004 | Metzger, Jr. |
| 2004/0159198 | A1 | 8/2004 | Peot et al. |
| 2004/0194594 | A1 | 10/2004 | Dils et al. |
| 2004/0200329 | A1 | 10/2004 | Sako |
| 2004/0226424 | A1 | 11/2004 | O'Banion et al. |
| 2004/0226800 | A1 | 11/2004 | Pierga et al. |
| 2005/0057206 | A1 | 3/2005 | Uneyama |
| 2005/0139058 | A1 | 6/2005 | Gass et al. |
| 2005/0235793 | A1 | 10/2005 | O'Banion et al. |
| 2006/0096425 | A1 | 5/2006 | Keller |
| 2006/0101960 | A1 | 5/2006 | Smith et al. |

FOREIGN PATENT DOCUMENTS

| | | | |
|---|---|---|---|
| DE | 3427733 | | 1/1986 |
| DE | 4326313 | | 2/1995 |
| DE | 19609771 | | 6/1998 |
| DE | 20102704 | | 2/2001 |
| JP | 10062861 | A * | 3/1998 |
| JP | 11052477 | A * | 2/1999 |
| WO | WO 03/006213 | | 1/2003 |

OTHER PUBLICATIONS

*Microelectronic Circuits*, Sedra et al., pp. 995-997, 1998.

U.S. Appl. No. 60/157,340, filed Oct. 1, 1999, entitled "Fast-Acting Safety Stop."

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).

Two photographs of a saw displayed at a trade show on Aug. 23, 2000.

Young Inventor: Teen's Device Earns Her Trip to Science Fair, *The Arizona Republic*, May 5, 2006.

Operator Injury Mitigation Using Electronic Sensing and Mechanical Braking and Decoupling Devices in Handheld Circular Saws, Erin F. Eppard, date unknown.

*You Should Have Invented It*, French television show video.

\* cited by examiner

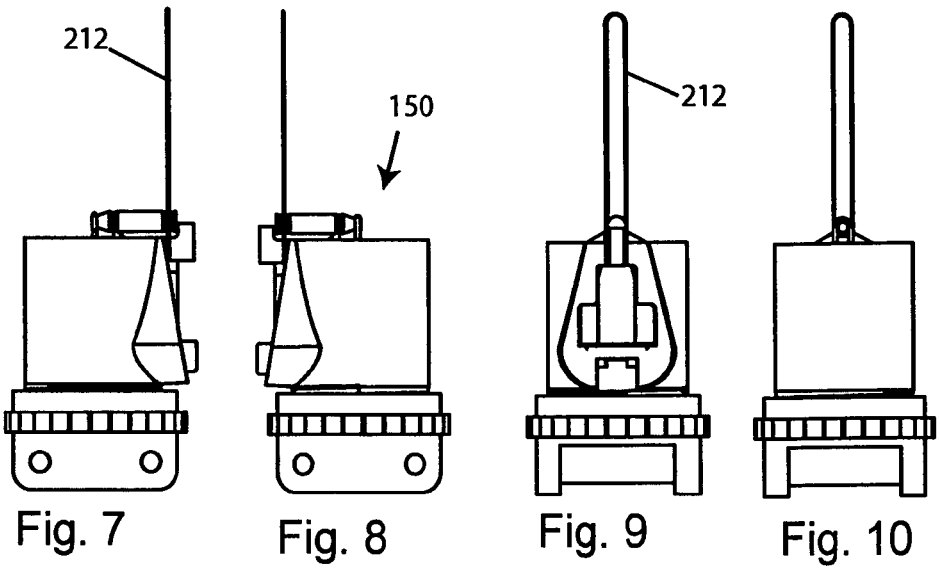
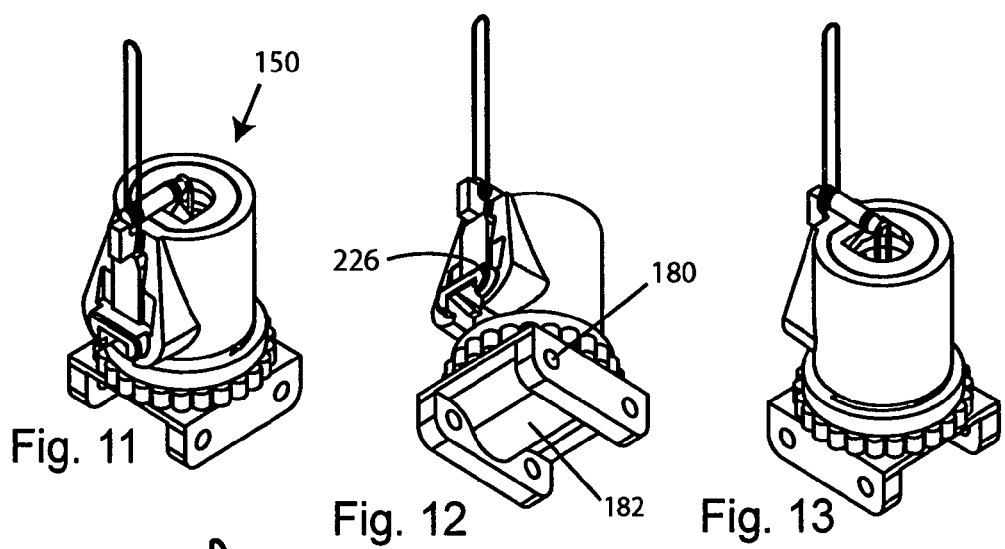
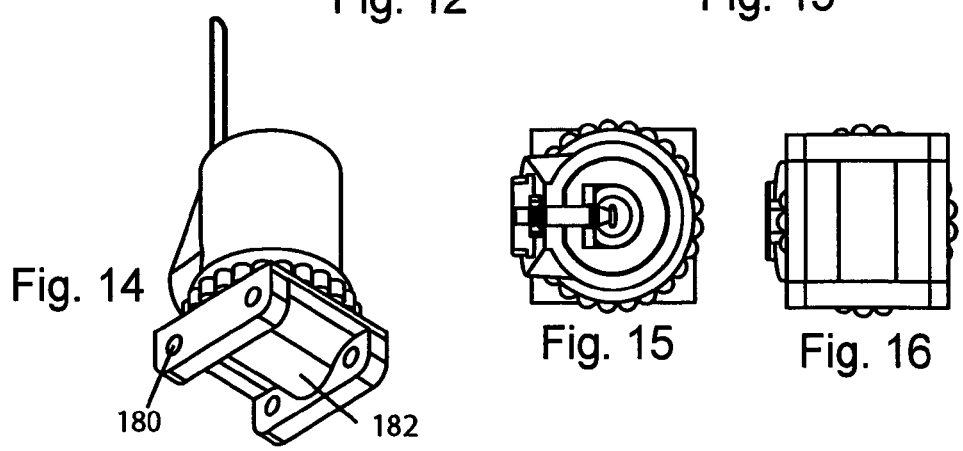

SECTION A-A

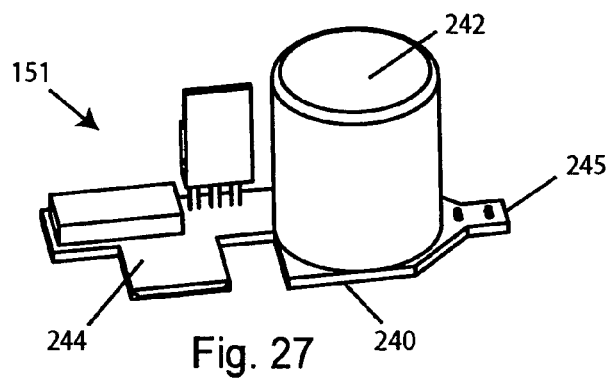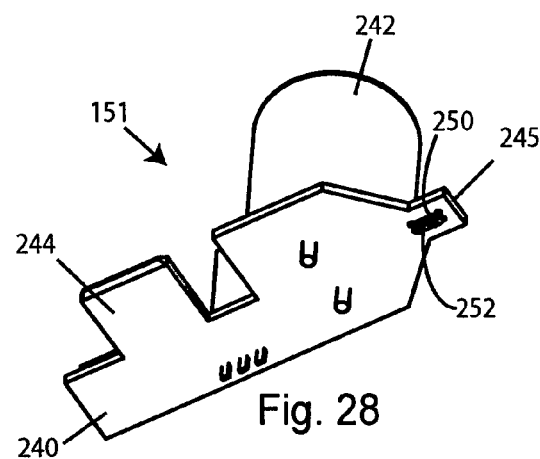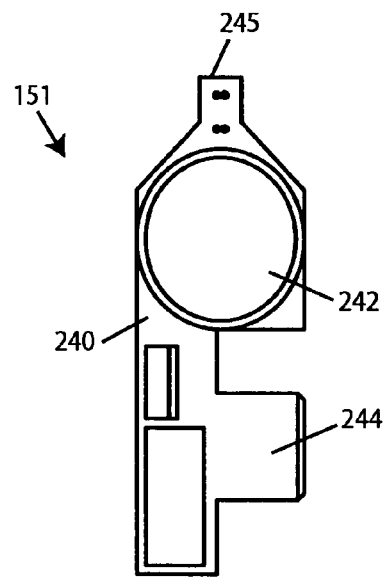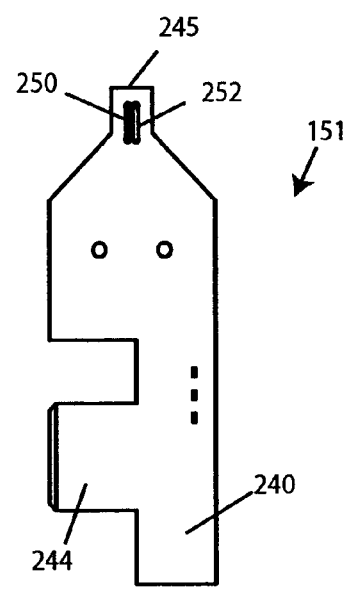

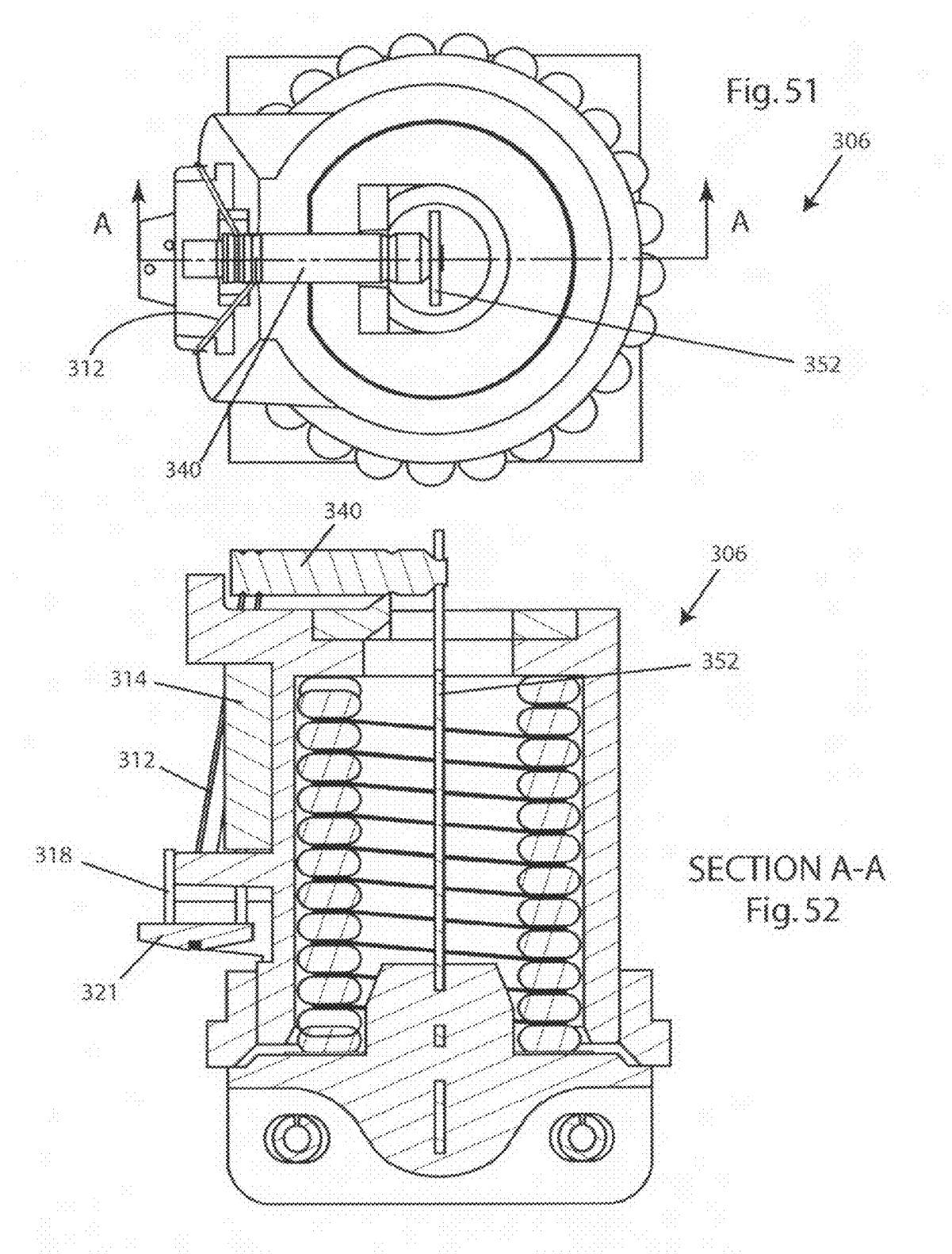

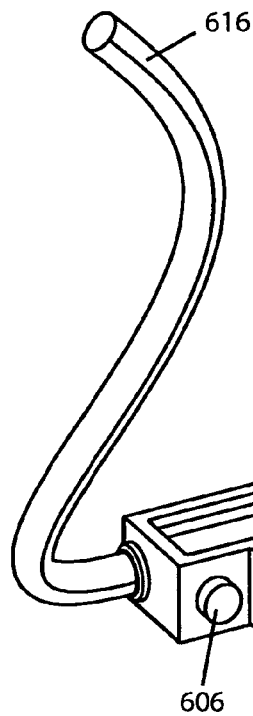
Fig. 79
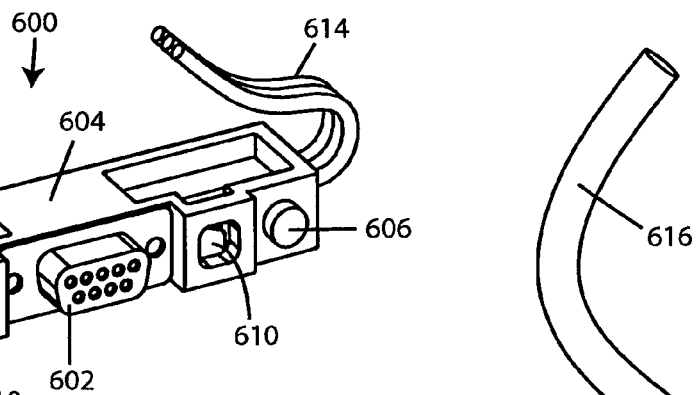
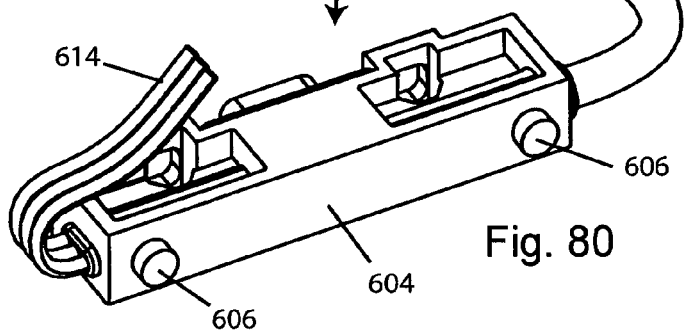
Fig. 80
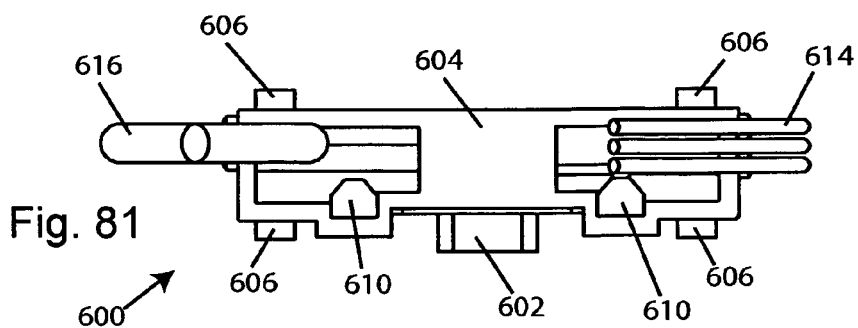
Fig. 81

BRAKE CARTRIDGES FOR POWER EQUIPMENT

CROSS-REFERENCE TO RELATED APPLICATION

This application is a divisional continuation of U.S. patent application Ser. No. 10/923,273 filed Aug. 20, 2004, and issuing as U.S. Pat. No. 7,350,445 on Apr. 1, 2008, which in turn claimed the benefit of and priority from U.S. Provisional Patent Application Ser. No. 60/496,574, filed Aug. 20, 2003. The disclosures of these applications are hereby incorporated by reference in their entireties.

FIELD

The present invention relates to safety systems for power equipment, and more particularly, to replaceable brake cartridges for use in safety systems for woodworking equipment and other power equipment.

BACKGROUND

Safety systems are often employed with power equipment such as table saws, miter saws, band saws, jointers, shapers, circular saws and other woodworking machinery, to minimize the risk of injury when using the equipment. Probably the most common safety feature is a guard that physically blocks an operator from making contact with dangerous components of the equipment, such as blades, belts, or shafts. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of a machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

The present document discloses safety systems for use on power equipment. The disclosed safety systems include a replaceable brake cartridge adapted to engage a blade or other cutting tool to protect the user against serious injury if a dangerous, or triggering, condition occurs.

BRIEF DESCRIPTION OF THE DRAWINGS

FIG. 7 is a side elevation view of an actuator assembly used in the brake cartridge of FIG. 3.

FIG. 8 is another side elevation view of the actuator assembly shown in FIG. 7.

FIG. 9 is a front elevation view of the actuator assembly shown in FIG. 7.

FIG. 10 is a back elevation view of the actuator assembly shown in FIG. 7.

FIG. 11 is a perspective top, front view of the actuator assembly shown in FIG. 7.

FIG. 12 is a perspective bottom, front view of the actuator assembly shown in FIG. 7.

FIG. 13 is a perspective back, top view of the actuator assembly shown in FIG. 7.

FIG. 14 is a perspective bottom, back view of the actuator assembly shown in FIG. 7.

FIG. 15 is a top elevation view of the actuator assembly shown in FIG. 7.

FIG. 16 is a bottom elevation view of the actuator assembly shown in FIG. 7.

FIG. 27 shows a perspective view of a circuit board used in the brake cartridge shown in FIG. 3.

FIG. 28 shows another view of the circuit board used in the brake cartridge shown in FIG. 3.

FIG. 29 shows a top view of the circuit board shown in FIG. 27.

FIG. 30 shows a bottom view of the circuit board shown in FIG. 27.

FIG. 51 shows a top elevation view of the actuator used in the brake cartridge in FIG. 34.

FIG. 52 shows a side elevation view of the actuator in FIG. 51, taken along the line A-A.

FIG. 79 shows a perspective view of a plug.

FIG. 80 shows another perspective view of the plug shown in FIG. 79.

FIG. 81 shows a top elevation view of the plug shown in FIG. 81.

DETAILED DESCRIPTION

Figure 1:
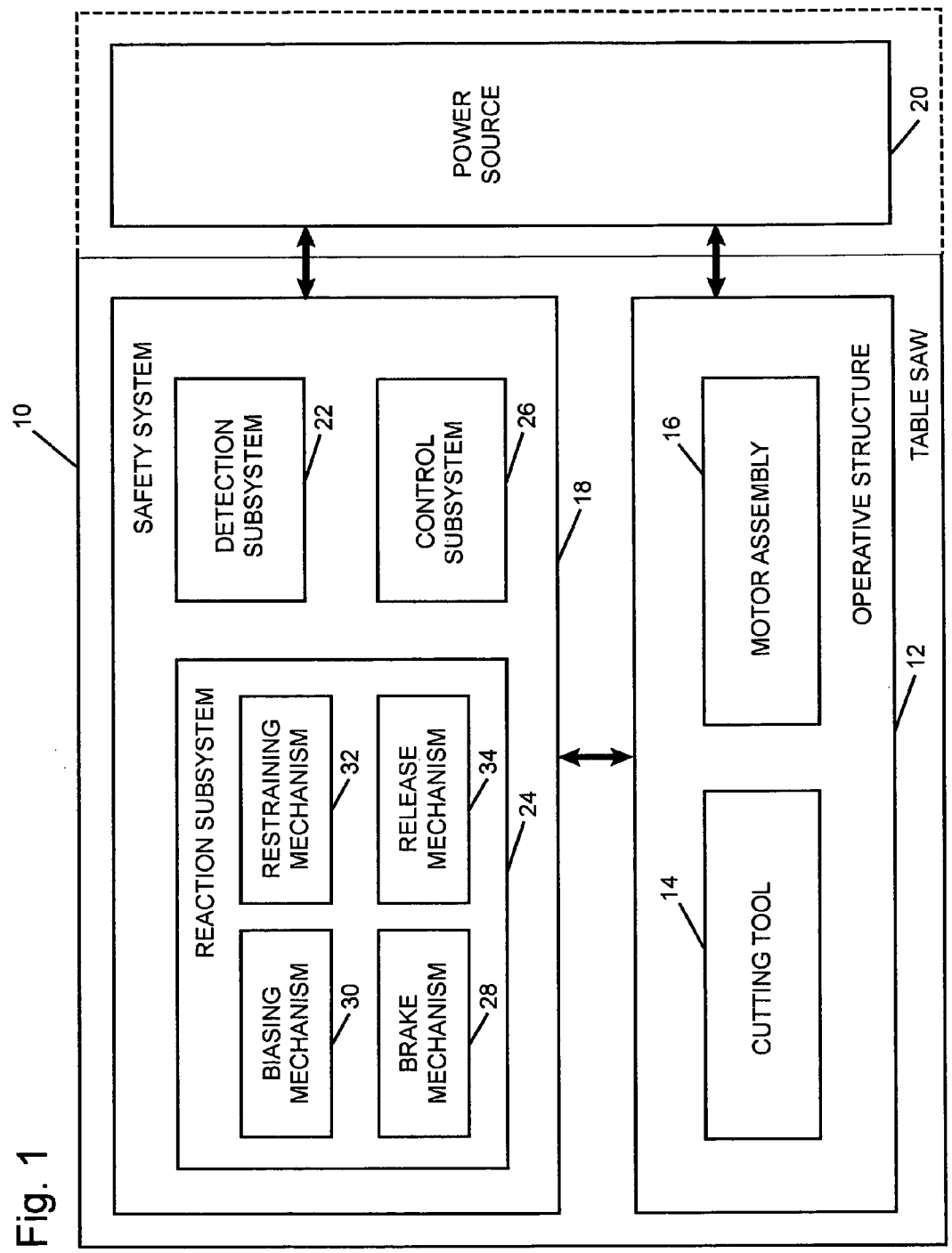
FIG. 1 is a schematic block diagram of a machine with a fast-acting safety system.

A machine incorporating a safety system is shown schematically in FIG. 1 and indicated generally at 10. Machine 10 may be any of a variety of different machines adapted for cutting work pieces, such as wood or plastic, including a table saw, miter saw or chop saw, radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18, configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. Cutting tool 14 typically includes one or more blades or other suitable cutting implements that are adapted to cut or remove portions from the workpieces. For example, in table saws, miter saws, circular saws and radial arm saws, cutting tool 14 will typically include one or more circular rotating blades having a plurality of teeth disposed along the perimetrical edge of the blade. Alternatively, the cutting tool may be a plurality of circular blades, such as a dado blade or dado stack. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Patent Application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
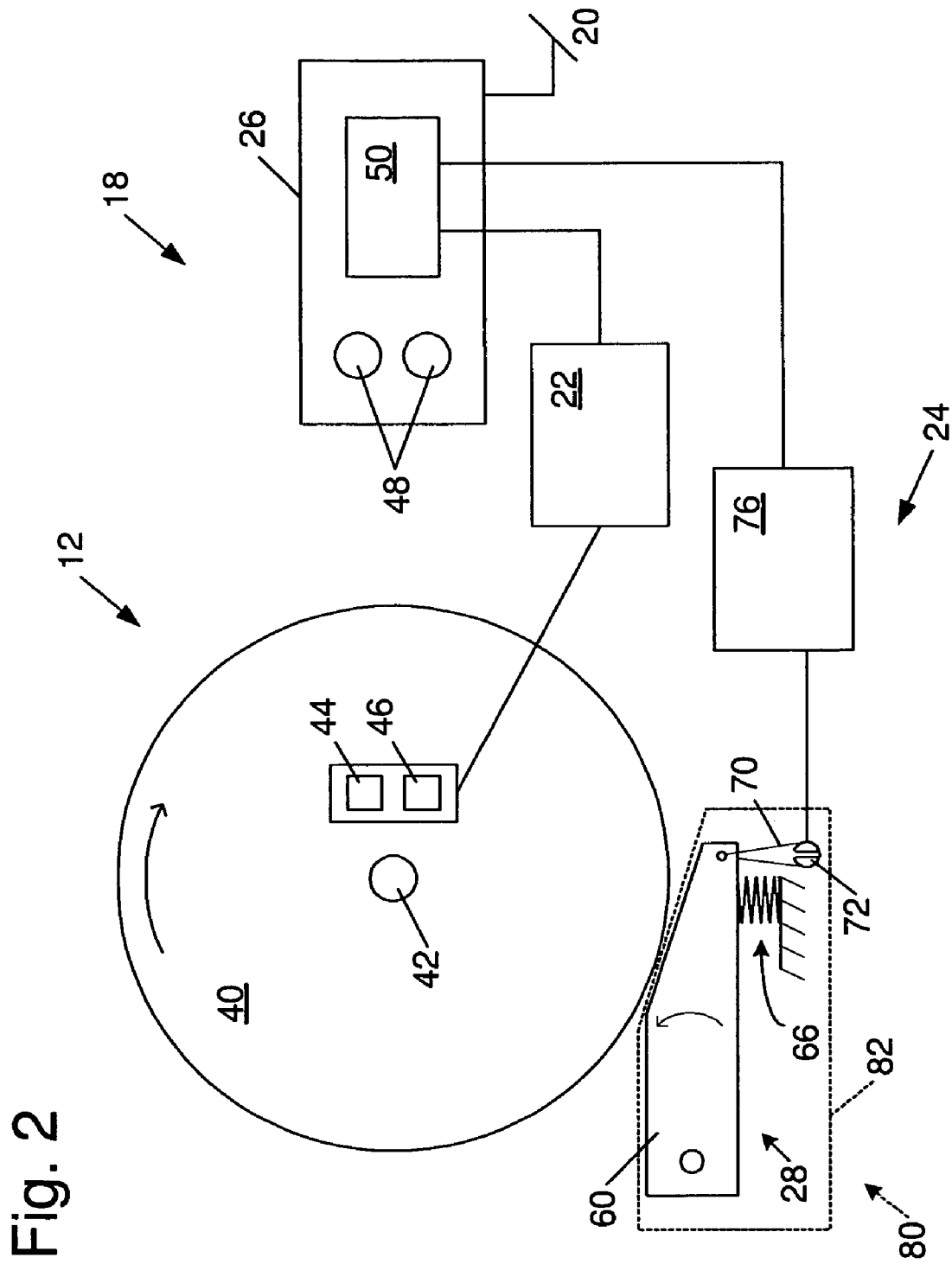
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," filed Aug. 27, 2002 by SD3, LLC, and U.S. Provisional Patent Application Ser. No. 60/496,550, entitled "Table Saws with Safety Systems and Blade Retraction," filed Aug. 20, 2003 by SD3, LLC, the disclosures of which are all herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. Patent Application Publication No. 2003/0090224 A1, entitled "Detection System for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," U.S. Patent Application Publication No. 2003/0058121 A1, entitled "Logic Control With Test Mode for Fast-Acting Safety System," and U.S. Provisional Patent Application Ser. No. 60/496,568, entitled "Motion Detecting System for use in a Safety System for Power Equipment," filed on Aug. 20, 2003 by SD3, LLC, the disclosures of which are all herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately ⅟₃₂-inch to ¼-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," and U.S. Patent Application Publication No. 2003/0140749 A1, entitled "Brake Pawls for Power Equipment," the disclosures of which are herein incorporated by reference.

While one particular implementation of safety system 18 has been described, it will be appreciated that many variations and modifications are possible within the scope of the invention. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

Figure 3:
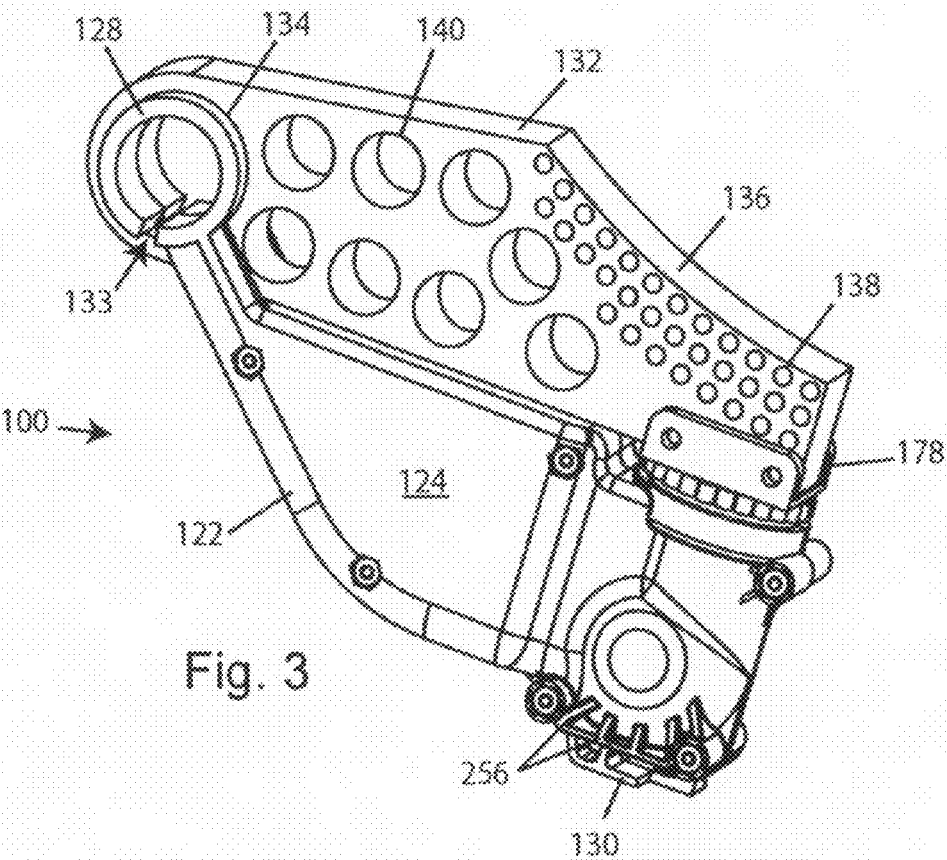
FIG. 3 is a perspective view of a brake cartridge.
Figure 4:
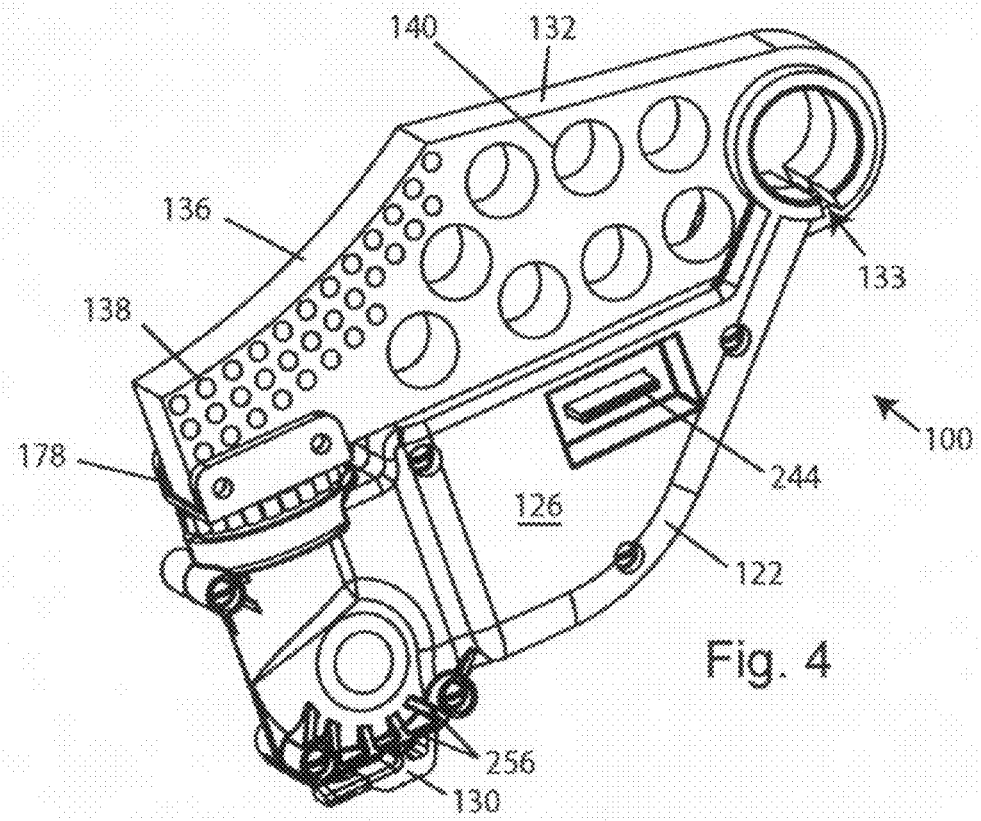
FIG. 4 is another perspective view of the brake cartridge shown in FIG. 3.

FIGS. 3 and 4 show a replaceable brake cartridge 100 that may be used in reaction subsystem 24 to stop and/or retract a cutting tool away from the point of accidental contact with a user. Brake cartridge 100 is specifically applicable for use with table saws like those described in U.S. Provisional Patent Application Ser. No. 60/496,550, entitled "Table Saws With Safety Systems and Blade Retraction," filed on Aug. 20, 2003 by SD3, LLC, the disclosure of which is herein incorporated by reference.

Figure 5:
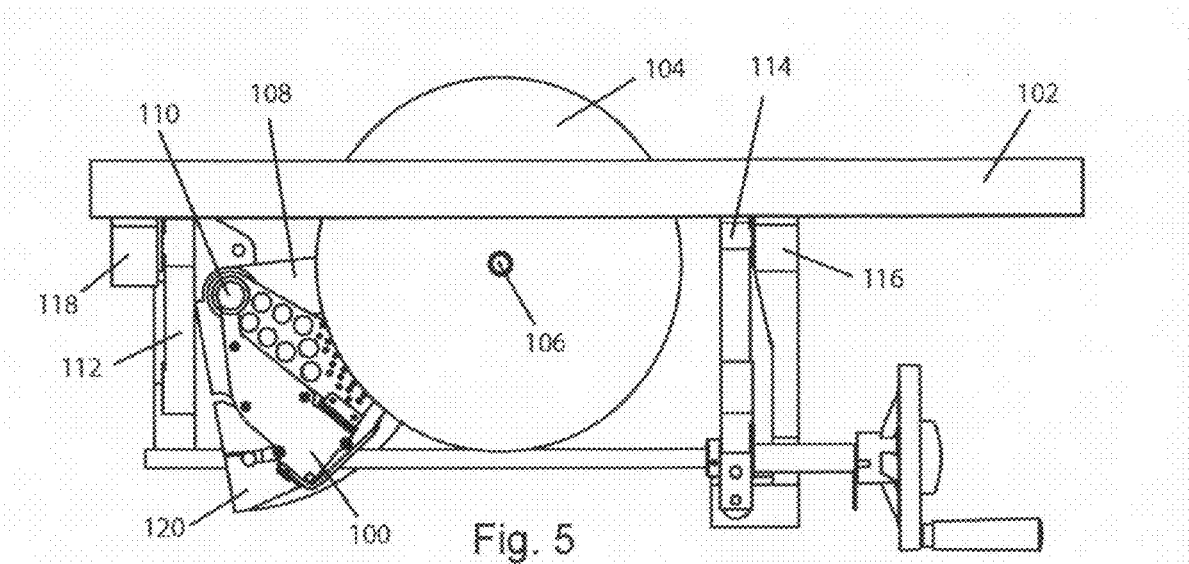
FIG. 5 is a simplified elevation view of a brake cartridge in a table saw. Various components of the table saw, including the cabinet, stand, motor, drive belt, etc., have been removed for clarity.

FIG. 5 shows a simplified view of a table saw including a table 102 and a blade 104 extending up through the table. The blade is mounted on a rotatable arbor 106 that is held in bearings (not shown) mounted in an arbor block 108, as is known in the art. The arbor block is pivotally connected by a pin 110 to a rear trunnion 112. The rear trunnion is connected to a front trunnion 114, and the two trunnions are mounted on front and rear trunnion blocks 116 and 118, respectively. Many components of the table saw have been removed from FIG. 5 for clarity, including the structure connecting the front and rear trunnions, the motor, the drive belt, the cabinet, the stand, etc. The saw is constructed so that a user may adjust the elevation and tilt of the blade relative to the tabletop as is known in the art or as is disclosed in the references incorporated herein by reference.

FIG. 5 shows cartridge 100 mounted in the table saw on pin 110. The cartridge is held in place by a bracket 120 supported by pin 110 and connected to arbor block 108. As can be seen in FIG. 5, brake cartridge 100 is positioned close to the perimeter of blade 104 so that if the detection subsystem in the saw detects a dangerous condition, the brake cartridge can react quickly to engage and stop the blade. The cartridge and bracket are configured so that the position of the cartridge relative to the blade is maintained when the blade elevation or tilt changes. For example, the bracket and cartridge are supported by pin 110 so that the bracket and cartridge can pivot up or down when the arbor block and blade pivot up or down.

As shown in FIGS. 3 and 4, cartridge 100 includes a housing 122. The housing is typically made from a molded thermoplastic, such as ABS or PCABS, and it encloses various components, as explained below. Housing 122 is made of two halves 124 and 126, and the halves are joined together by screws and nuts as shown. Alternatively, the halves may be joined by an adhesive, sonic welding, snap fits, etc., or a combination of these methods. It is desirable that the housing be sealed so that dust or other debris does not enter the cartridge and impair the functioning of the various components therein.

Cartridge 100 includes an end 128 defining an annular opening that is configured to slide over a pin to mount the cartridge in a saw, such as pin 110 shown in FIG. 5. The cartridge also includes a tab 130 (shown in FIGS. 3, 4 and 6) configured to slide over a flange on bracket 120 to help hold the cartridge in place in the saw.

Brake cartridge 100 also includes a brake pawl 132 designed to engage and stop a spinning blade. Specifically, the pawl is designed to pivot out into contact with the teeth of a spinning blade so that the teeth cut into the pawl and bind, thereby stopping the blade from spinning. Pawl 132 is formed from fully annealed aluminum, which is sufficiently soft for the teeth of a spinning blade to cut into while also being sufficiently strong to stop the blade. However, as stated above, the pawl may be made from a number of materials. It has been found that pawls made from fully annealed aluminum stop the blade significantly faster than pawls made from other materials such as thermoplastic. For example, a pawl made from a thermoplastic such as ABS may stop a 10 inch, 28 tooth blade spinning at approximately 3500 rpms in approximately 5 milliseconds, while a pawl made from fully annealed aluminum may stop the same blade in approximately 2 to 3 milliseconds or less. It has also been learned that pawls made of fully annealed aluminum work significantly better in stopping 200 tooth blades and plywood blades than pawls made from thermoplastic because the aluminum is less likely to collect in the gullets between the teeth of the blade.

Brake pawl 132 includes an annular aperture 134 that is sized to fit over the outside of end 128, as shown in FIGS. 3 and 4. In this manner, brake pawl 132 may pivot around end 128. The brake pawl and housing are assembled by inserting end 128 of one half of housing 122 into aperture 134, inserting end 128 of the other half of housing 122 into the aperture, and then joining the two halves together.

End 128 includes a slot 133 that extends completely through the end from one side of the housing to the other. Slot 133 functions to prevent pawl 132 from binding on end 128. If debris collects between end 128 and pawl 132, or if heat causes end 128 to expand more than the pawl expands so that the brake pawl binds on end 128, then as brake pawl pivots out or away from housing 122, end 128 will compress because of the slot and thereby release the pawl. Thus, slot 133 helps insure that pawl 132 is always able to pivot out into contact with the blade. End 128 also may have a recessed section on its outer surface to minimize any friction between end 128 and pawl 132.

Pawl 132 includes a curved surface 136 configured to match the curvature of the perimeter of a blade. Thus, when the pawl pivots out into contact with the blade, the entire surface will contact the blade at the same time and stop the blade quicker than if only part of the surface contacted the blade.

A plurality of holes, such as hole 138, are cut into pawl 132 immediately below surface 136. These holes create what may be thought of as a collapse zone. The holes make it easier for the teeth of a spinning blade to cut into the pawl and bind.

Pawl 132 also includes several large holes, such as hole 140. These holes minimize the mass of the pawl so that with a given force the pawl can accelerate into the blade faster. The large holes also create another collapse zone so that the pawl can deform to absorb the energy of the spinning blade. It is desirable for the pawl to absorb the energy of the blade by deforming because otherwise stopping the blade may bend or damage the arbor on which the blade is mounted.

Figure 62:
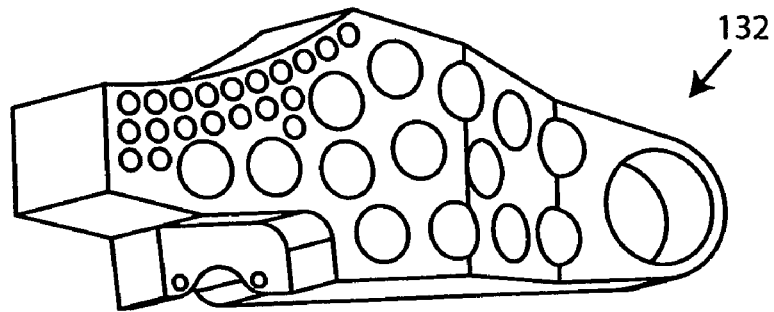
FIG. 62 shows a perspective view of a brake pawl for a dado blade stack.
Figure 63:
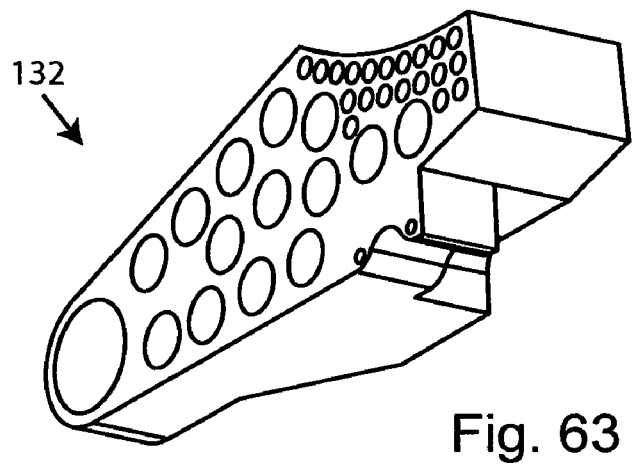
FIG. 63 shows another perspective view of the brake pawl of FIG. 62.
Figure 64:
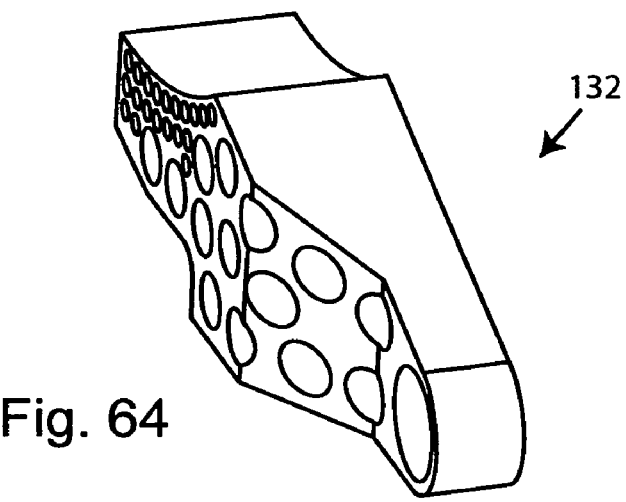
FIG. 64 shows still another perspective view the brake pawl shown in FIG. 62.

Pawl 132 may take different shapes for different blades. The pawl shown in FIGS. 3 and 4 is designed for blades with 10 inch diameters. The pawl may be wider and longer for 7 or 8 inch dado blades, for example. FIGS. 62 through 64 show a pawl 133 designed for an 8 inch dado stack up to $^{13}/_{16}$ths of an inch wide. The pawl is designed to be mounted on a cartridge housing like housing 122 discussed above. The pawl is thicker and longer so that it is adjacent the perimeter of the dado stack when the cartridge is installed in the saw.

Figure 6:
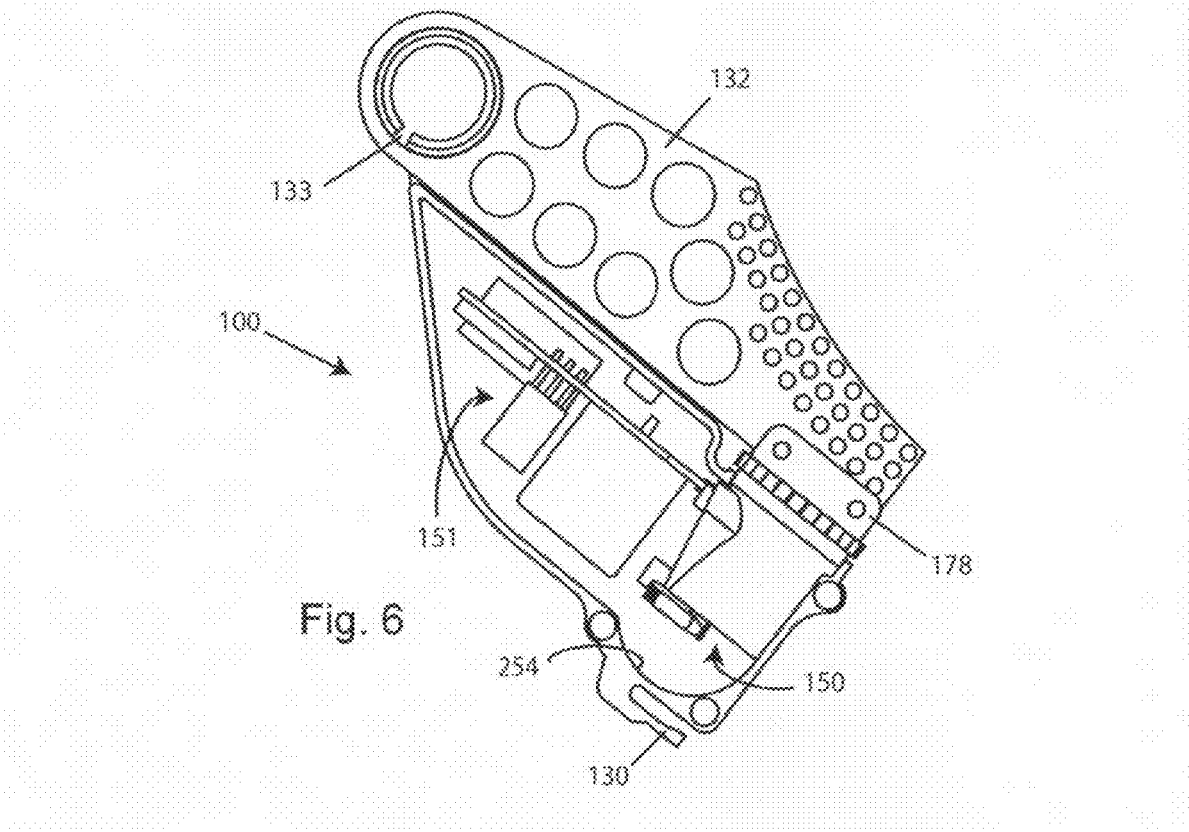
FIG. 6 is shows generally the interior components of the brake cartridge shown in FIG. 3.

FIG. 6 shows brake cartridge 100 with one half of the housing removed so that internal components are visible. These components include an actuator assembly 150 and electronics 152.

Actuator assembly 150 is the portion of cartridge 100 that causes pawl 132 to move into the blade upon the detection of a dangerous condition. The actuator assembly includes a coil spring held in compression by a lever pin on a fulcrum. A link extends up through the coil of the spring and over one end of the lever, and a fuse wire is looped over the other end of the lever. When a dangerous condition is detected, a surge of electricity burns the fuse wire, releasing the lever pin. The spring then expands, pushing the pawl out, into the teeth of the spinning blade.

Actuator assembly 150, and the individual components that make up the assembly, are shown in more detail in FIGS. 7 through 26. The actuator assembly is shown in cross-section in FIG. 26. The assembly includes a coil spring 152 (shown in FIG. 26) that exerts approximately 150 pounds of force when compressed. Of course, various springs that exert different forces can be used. Generally, the greater the force the faster the actuator, but the more difficult it is to hold the spring in compression and release the spring quickly.

Figure 18:
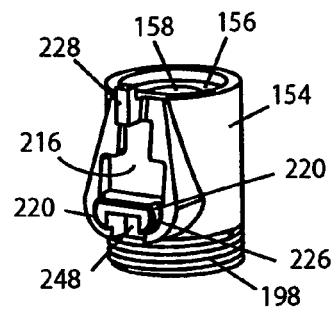
FIG. 18 shows a spring housing used in the actuator shown in FIG. 7.
Figure 19:
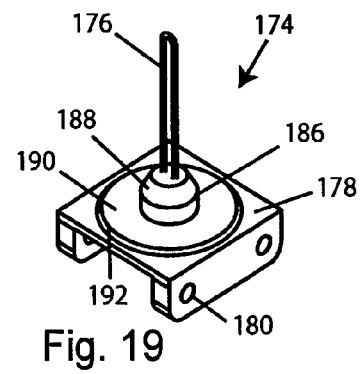
FIG. 19 shows a link used in the actuator shown in FIG. 7.
Figure 20:
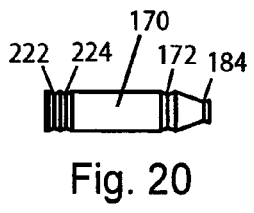
FIG. 20 shows a lever used in the actuator shown in FIG. 7.
Figure 21:
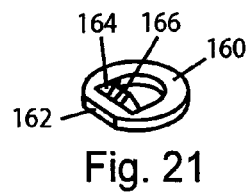
FIG. 21 shows a fulcrum used in the actuator shown in FIG. 7.
Figure 22:
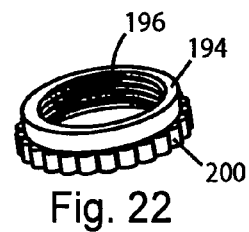
FIG. 22 shows a nut used in the actuator shown in FIG. 7.

Compressed spring 152 is housed in a spring housing 154 shown individually in FIG. 18. The spring housing is a generally cylindrical housing with an interior cavity shaped and sized to accommodate spring 152 and hold the spring stable when compressed. An annular flange 156 is recessed slightly from the top of the spring housing, with the flange extending inwardly around the inside of the housing, leaving a hole 158. The annular flange defines the bottom of a recess in which is placed a cap 160 (shown individually in FIG. 21). Cap 160 is stamped from sheet metal, and it includes a flat edge 162. The recess in the spring housing includes a corresponding flat edge so that the cap can be placed in the recess in one orientation only. Cap 160 also includes a fulcrum 164 having a notch 166. A lever pin 170 (shown individually in FIG. 20), made from hardened steel, such as ⅛-inch-diameter music wire, includes a notch 172, and the lever pin is positioned on fulcrum 164 so that notch 166 in the fulcrum and notch 172 in the lever pin mesh. Notch 166 in the fulcrum is "V" shaped so that the lever pin will nest into notch 166.

A link 174 (shown individually in FIG. 19) includes a hardened steel wire 176 that is curved to form an inverted "U" shape. The ends of the wire are insert molded into a base 178, and the ends may be kinked or bent to minimize the possibility of the wire pulling out of the base. The wire loop may be made of music wire, and should have a tensile strength sufficient to hold the coil spring in compression over time. Base 178 also may be referred to as a yoke because it spans across a portion of brake pawl 132, as shown in FIGS. 3, 4 and 6. The yoke includes four holes, like hole 180 shown in FIGS. 12, 14 and 19. Brake pawl 132 includes corresponding holes. Pins or screws are inserted through the holes to join the yoke to the brake pawl. The bottom of the yoke also includes a ridge 182 to strengthen the yoke, and the surface of the brake pawl over which the yoke spans is shaped to accommodate the ridge.

Figure 26:
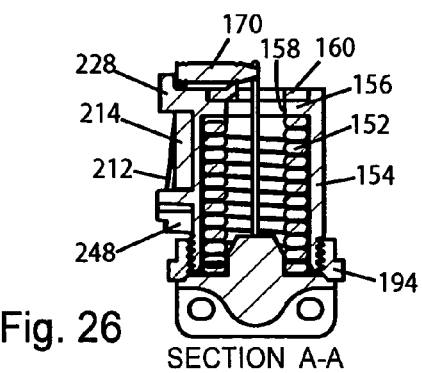
FIG. 26 shows a cross-section view taken along the line A-A in FIG. 25.

Link 174 is inserted up through coil spring 152 and over the end of lever pin 170, as shown in FIG. 26. Lever pin 170 includes a second notch 184 over which link 174 extends, and the end of lever pin 170 between notches 172 and 184 tapers down to a size corresponding to the bend in wire 176. Notch 184 is sized and configured so that link 174 may come off the lever pin cleanly when the lever pin is released, as explained below.

Link 174 also includes a raised central portion 186 that helps position the spring relative to the link and helps hold the spring stable when it is compressed, as shown in FIG. 26. The raised central portion is sized and configured to correspond to the inner dimensions of coil spring 152. Raised central portion 186 includes a tapered surface 188 that makes it easier to insert the raised central portion into the coil spring.

Base 178 of the link includes a slightly raised, circular section 190 with a tapered edge 192. Section 190 is configured to correspond to the base of spring housing 154, as shown in FIG. 26. Tapered edge 192 is configured to mesh with the bottom edge of a nut 194, also shown in FIG. 26. The nut is shown individually in FIG. 22, and it includes internal screw threads 196. The bottom of spring housing 154 includes corresponding, external screw threads 198.

When assembled, nut 194 is threaded onto spring housing 154, and link 174 is held against the bottom of the spring housing by the lever pin. The nut may then be threaded down until it presses against base 178 of link 174, as shown in FIG. 26. Nut 194 includes a knurled edge 200 so that the nut can be turned by hand. The nut is threaded down against the base of the link in order to seal the actuator against the entry of dust or other contaminants. A foam washer (not shown) may be inserted and compressed between nut 194 and base 178 to further effectuate a seal. Nut 194 also is threaded down against base 178 to help hold the compressed spring stable and to take up any play in the linkage between the lever, spring, spring housing, cap, and link resulting from manufacturing tolerances.

Figure 17:
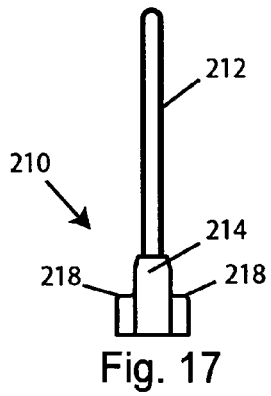
FIG. 17 shows a fuse wire and anchor used in the actuator shown in FIG. 7.

A fuse wire assembly 210 is shown in FIG. 17, including an inverted "U" shaped wire 212 insert molded into an anchor 214. Wire 212 is a hardened steel wire such as music wire, and the ends of the wire may be kinked or bent to minimize the possibility of the wire pulling out of the anchor. Anchor 214 is shaped to fit into a socket 216 in spring housing 154, and the anchor includes shoulders 218 to help hold the anchor in the socket.

When the fuse wire assembly is initially placed into socket 216, wire 212 extends up and around lever pin 170, as shown in FIGS. 7 through 14. During assembly of the actuator, wire 212 is twisted above the lever pin and then pulled down over the lever pin and around shoulders 220 in spring housing 154, as shown in FIGS. 23 through 26. (FIGS. 39 and 40 also show how the wire is twisted in the context of an alternative fuse wire assembly.) Twisting wire 212 and pulling it down so that it extends around shoulders 220 causes four strands of the wire to hold down the lever pin. Lever pin 170 includes notches 222 and 224 over which the fuse wire extends.

When assembled, actuator 150 holds spring 152 in compression by link 174 and fuse wire assembly 210 holding lever pin 170 on fulcrum 164. Spring 152 and link 174 exert a force tending to pull the lever pin down, but the lever pin is held in place by the fuse wire. The fuse wire is positioned over the lever pin a sufficient distance from fulcrum 166 in order to provide a mechanical advantage to help hold the lever pin in place. The mechanical advantage allows the fuse wire to be smaller and less strong that it otherwise would have to be. In actuator 150, the mechanical advantage is approximately 3:1. Thus, notches 222 and 224 are approximately three times further from notch 172 than notch 184 is from notch 172. With a 3:1 mechanical advantage and a spring that exerts a 150-pound force when compressed, the fuse wire would need to hold approximately 50 pounds of force. However, because the fuse wire is twisted so that four strands of the wire together hold the lever down, each strand of wire would need to hold approximately 12 to 13 pounds of force. Music wire of approximately 0.010-inch diameter is believed to have sufficient tensile strength to hold that force. It is advantageous to use a fuse wire with a relatively small diameter because the fuse wire must be fused in order to release the spring and smaller diameter wires are easier to fuse. The mechanical advantage discussed above allows for a small diameter fuse wire to hold a large force.

Actuator 150 is assembled using a jig that holds the spring in compression while lever pin 170, link 174 and fuse wire 210 are positioned. Shoulders 220 on spring housing 154 may include a tapered edge 226 (labeled in FIGS. 12 and 18) to make it easier to slide the fuse wire onto the shoulders during assembly. The shoulders themselves may be slightly sloped to keep the fuse wire from sliding off the shoulders. The jig is then released, and the spring puts tension on the link and fuse wire to hold the assembly together. When assembled, actuator 150 is quite stable because spring 152 exerts a significant force on lever pin 170 and because the compressed spring is enclosed in housing 154.

Figure 23:
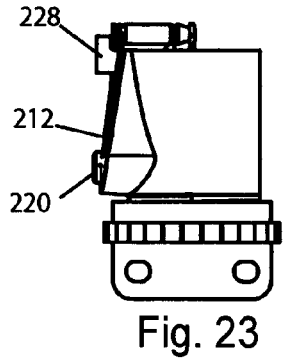
FIG. 23 is a side elevation view of the actuator shown in FIG. 7 with a fuse wire in place holding down a lever pin.
Figure 24:
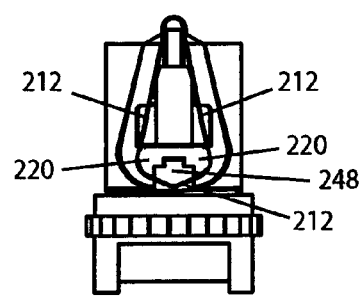
FIG. 24 is a front elevation view of the actuator shown in FIG. 23.
Figure 25:
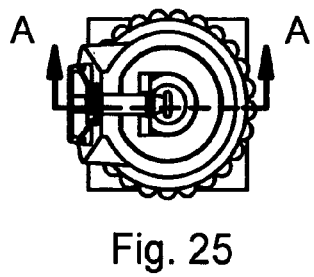
FIG. 25 shows a top view of the actuator shown in FIG. 23.

Spring housing 154 also includes a raised flange 228 positioned adjacent the end of lever pin 170, as shown in FIGS. 18, 23 and 26. Raised flange 228 functions to prevent lever pin 170 from being improperly positioned during assembly. Specifically, flange 228 prevents lever pin 170 from being positioned so that it is balanced on fulcrum 164 between notch 172 and notch 184.

Housing 154, link base 178, and fuse wire anchor 214 are typically made from a moldable material that has very little creep, or in other words, is very dimensionally stable over time. It is important that the material be able to maintain its shape and withstand the constant force of the compressed spring on the link and fuse wire. Otherwise, for example, if the shape of shoulders 220 changed, then the fuse wire could become sufficiently slack so that link 174 could slip off the lever pin and accidentally release the spring. The material must also be sufficiently strong so that the fuse wire does not pull out of anchor 214, and so the link wire does not pull out of base 178. The material must also have little moisture absorption and little heat expansion so that the molded parts maintain their shapes and dimensions in various humid, dry, hot or cold climates. In the shown embodiment, housing 154, link base 178 and fuse wire anchor 214 are molded from a phenolic, thermoset material having very little creep. One such material is RX630 from a company called Vyncolit.

In the embodiment shown, fuse wire assembly 210 is separate from spring housing 154 to facilitate manufacturing. It is important that the length of fuse wire extending out from fuse wire anchor 214 be quite precise, otherwise there could be slack in the fuse wire allowing the link to slip off the lever pin. It is easier to make the fuse wire precise if the wire is insert-molded in a separate part. It is also easier to insert the fuse wire into a simple mold such as would be required for the fuse wire anchor. It would be difficult to insert the fuse wire into the mold for the spring housing. Nevertheless, the fuse wire could be insert-molded into the spring housing directly to eliminate the separate fuse wire anchor assembly.

It is also important that the length of link wire 176 extending out from link base 178 be sufficiently precise to prevent the link or fuse wire from slipping free.

Both the fuse and link wires must be sufficiently strong to withstand the tensile loads place on them, respectively. They must also be able to bend into the necessary shapes without breaking.

Cap 160 and lever pin 170 must be made of materials sufficiently strong to withstand the loads placed thereon. As stated, cap 160 may be stamped from sheet metal, and lever pin 170 may be machined from hardened steel such as ⅛-inch diameter music wire, for example.

Nut 194 may be molded from many materials, such as a thermoplastic like ABS.

When assembled, actuator 150 provides a compact, stable unit. The actuator is cocked and ready to apply a significant force when the fuse wire is severed, as will be explained below. The actuator may remain in its cocked condition for a significant period of time. The actuator is self-contained so that it may be easily placed into brake cartridge 100. While actuator 150 is described in the context of a brake cartridge used in a safety system for power equipment, it is believed that actuator 150 is a significant improvement in many respects over other actuators, and that there are many other possible uses of actuator 150.

FIGS. 27 through 30 show electronics 152 used with actuator 150 in brake cartridge 100. Electronics 152 include a printed circuit board 240 on which is mounted various electronic components used in the reaction subsystem described above, including capacitor 242. Other components on the circuit board may be those required for a firing circuit, as described above and as described in the references incorporated by reference.

Circuit board 240 also includes a card edge plug 244 on which would be traces for connecting the electronics to the rest of the saw via a card edge connector. Card edge plug 244 is also shown in FIG. 4 extending out from housing 122 of the brake cartridge. The cartridge is electronically connected to other components in the saw by plugging card edge plug 244 into a card edge connector mounted in the saw on bracket 120. Cartridge 100 may be sealed around card edge plug 244 by having the card edge extend out of the housing through a piece of foam on the inside wall of the housing, and by having the slot in the housing through which the card edge plug extends be only slightly larger than the card edge plug itself. Of course, various types of plugs may be used in place of a card edge connector.

Figure 31:
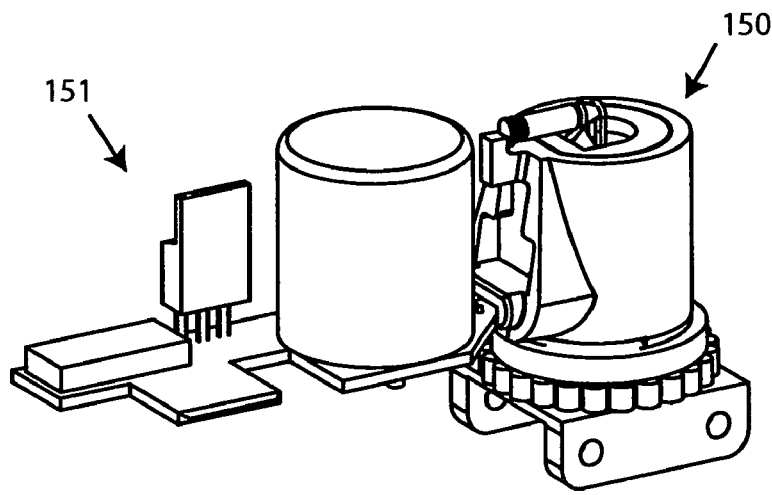
FIG. 31 shows the actuator of FIG. 7 with the circuit board of FIG. 28.
Figure 32:
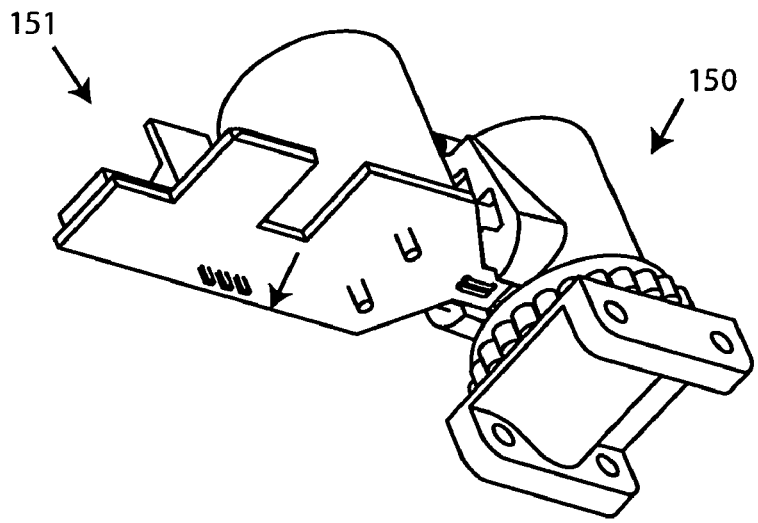
FIG. 32 is another view of the actuator of FIG. 7 with the circuit board of FIG. 28.
Figure 33:
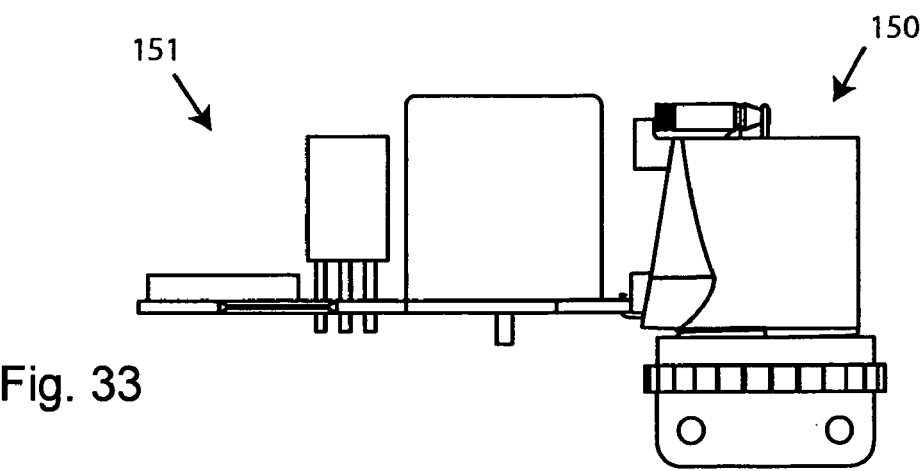
FIG. 33 is a side view of the actuator of FIG. 7 with the circuit board of FIG. 28.
Figure 46:
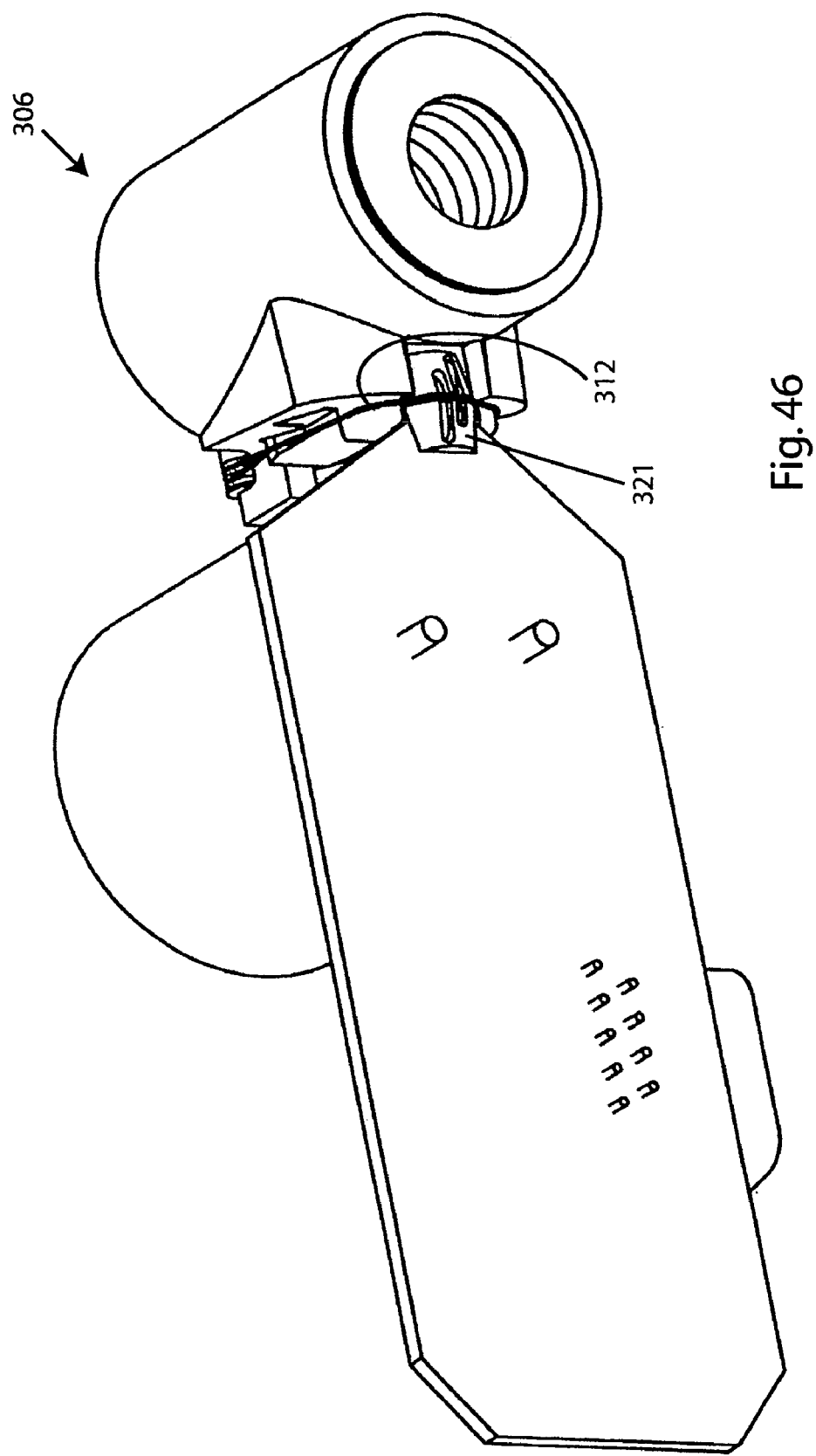
FIG. 46 is an enlarged view of a circuit board and actuator used in the brake cartridge of FIG. 34, showing the placement of the electrode isolator.

Circuit board 240 includes an end 245 shaped to fit into a socket 248 in spring housing 154. (Socket 248 is labeled in FIGS. 18, 24 and 26.) Socket 248 is configured and positioned relative to shoulders 240 so that fuse wire 212 spans across the bottom of the socket when the fuse wire is placed around shoulders 240. FIGS. 31 through 33 show how end 245 fits into socket 248. Fuse wire 212 is not shown in FIGS. 31 and 33 in order to show clearly how end 245 fits into the socket. (A fuse wire extending across electrodes is shown in FIG. 46.)

Two electrodes 250 and 252 are mounted on circuit board 240 on the side opposite the capacitor. The electrodes are typically formed wires. The electrodes are fitted into the circuit board and electrically connected to the capacitor via conductive traces. When end 245 of circuit board 240 is plugged into socket 248, electrodes 250 and 252 are in the bottom of the socket, as shown in FIG. 32. Fuse wire 212 would then extend over and across the two electrodes so that the fuse wire touches and bridges the electrodes. Socket 248 is configured relative to shoulders 240 on the spring housing, so that when end 245 of the circuit board is inserted into the socket, electrodes 250 and 252 press against the fuse wire. Socket 248 may include sloped or shaped surfaces to direct, position and hold end 245 properly in the socket. In this manner, actuator 150 is operatively coupled to electronics 152.

The coupled actuator 150 and electronics 152 may then be dropped into the housing of the brake cartridge. The housing typically would include internal ribs and flanges to position and hold the actuator and electronics in place.

In use, when the detection subsystem detects a dangerous condition, a signal is sent to electronics 152 in the brake cartridge causing capacitor 242 to discharge to ground by passing current from one electrode to the other through fuse wire 212. The size of the capacitor is chosen so that the current density discharged to ground is sufficiently high to fuse or break the fuse wire. When the fuse wire breaks, lever pin 170 is freed and spring 152 is released. The spring quickly expands, pushing pawl 132 out into the teeth of the blade.

The configuration of the fuse wire and electrodes as described above allows one break of the fuse wire to release all four strands of the wire holding down the lever pin. The fuse wire then unwraps from over the lever pin as the spring expands. The manner in which the fuse wire is twisted over the lever pin, and the way the fuse wire extends over shoulders 220 on the spring housing, allows the fuse wire to unwrap cleanly without tangling.

When the fuse wire breaks, lever pin 170 pivots down around fulcrum 164. As shown in FIG. 6, cartridge housing 122 includes a dome-shaped section 254 positioned adjacent lever pin 170 so that the lever pin is free to pivot around fulcrum 164 without catching.

Spring 152 will expand quickly when fuse wire 212 breaks. Flange 156 and cap 160 provide a surface against which the spring presses when it expands. Housing 122 typically would include ribs and/or flanges to support and securely hold the spring housing in place. Housing 122 also includes a tab 130, as discussed above, which helps secure and hold the brake cartridge in the saw. Housing 122 includes ribs, such as ribs 256 shown in FIGS. 3 and 4, to strengthen tab 130 so that it can withstand the force of the spring and transfer the force to the bracket holding the cartridge. Using flanges and ribs to strengthen tab 130, and securely mounting the cartridge to bracket 120 by tab 130, ensures that spring 152 pushes brake pawl 132 out instead of pushing the cartridge back.

Actuator 150 is capable of applying a significant force very quickly. In the embodiment shown, actuator 50 can supply 150 pounds of force instantly after the fuse wire is fused. This is significant because the quicker actuator 50 can apply the force to move the brake pawl into the spinning blade, the quicker the blade will stop, minimizing any injury.

Brake cartridge 100 is designed for installation in a right-tilt saw. In other words, the cartridge is designed for a saw where the blade above the table tilts to the right relative to a user standing in front of the saw. The cartridge could be mirrored for a left-tilt saw.

Figure 34:
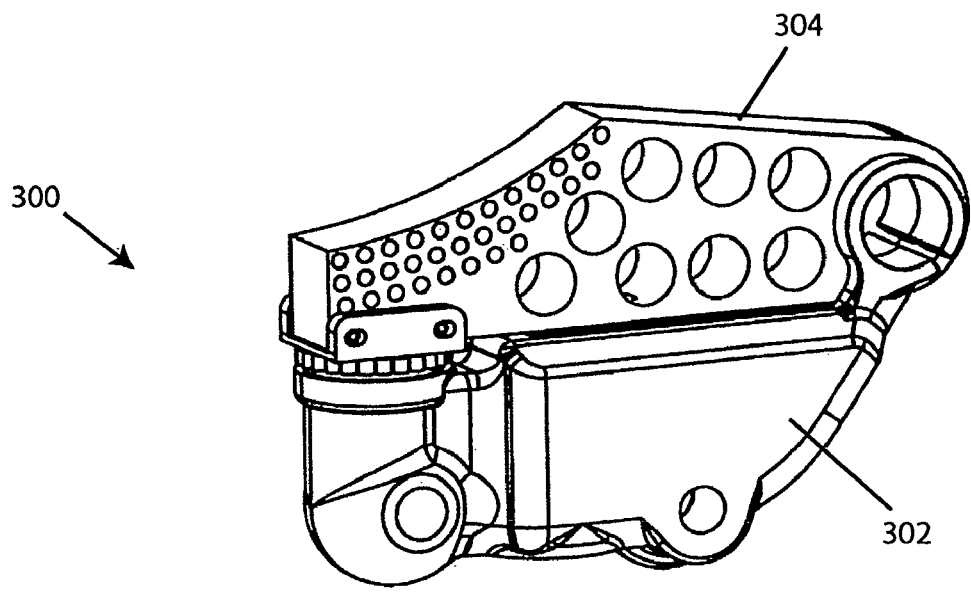
FIG. 34 shows another brake cartridge.
Figure 35:
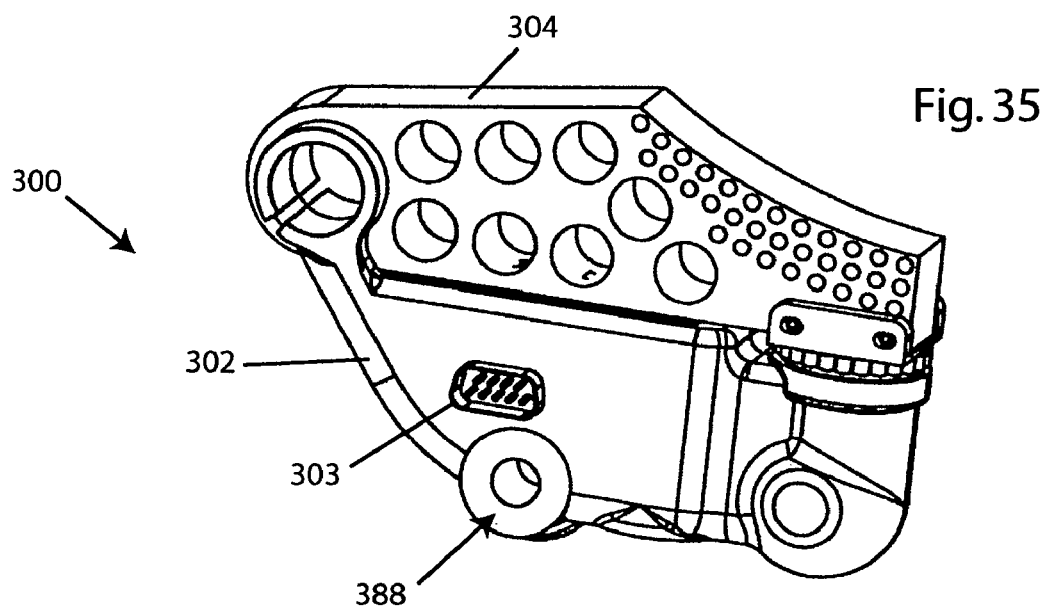
FIG. 35 shows another view of the brake cartridge of FIG. 34.

Another brake cartridge is shown in FIGS. 34 and 35 at 300. Much of cartridge 300 is similar to previously described brake cartridge 100. For example, brake cartridge 300 includes a housing 302 and a brake pawl 304 joined as described above in connection with cartridge 100. Additionally, housing 302 typically would include a tab like tab 130 shown in FIGS. 3 and 4, but the tab is not shown in connection with cartridge 300. Cartridge 300 also includes a D-sub plug 303 that may be used instead of the card edge plug described above. Cartridge 300 is also designed for a left-tilt saw instead of a right-tilt saw. Other differences between the two cartridges are discussed below.

Figure 36:
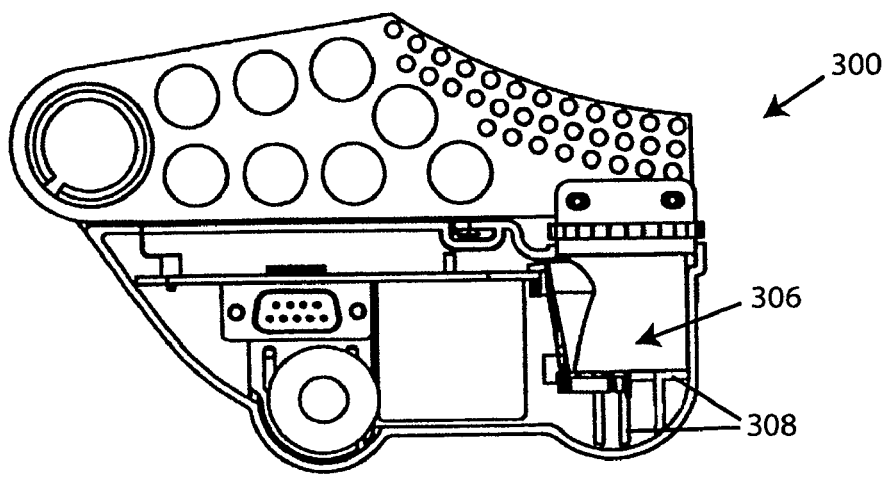
FIG. 36 is an elevation view of the interior of the brake cartridge shown in FIG. 34.
Figure 37:
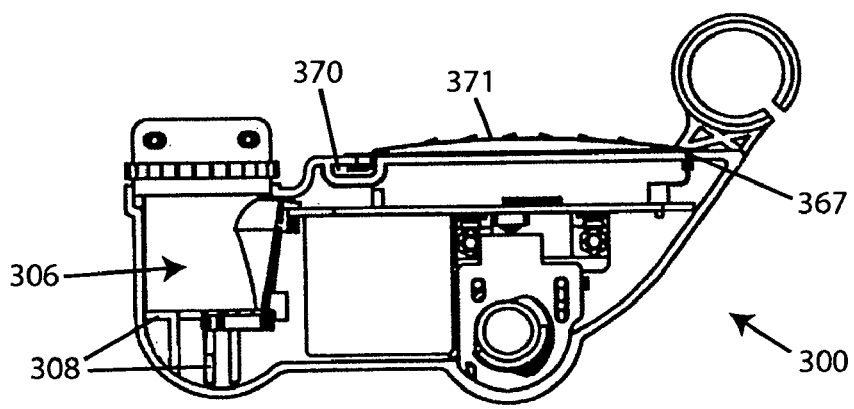
FIG. 37 is another elevation view of the interior of the brake cartridge shown in FIG. 34, with the brake pawl removed for clarity.
Figure 38:
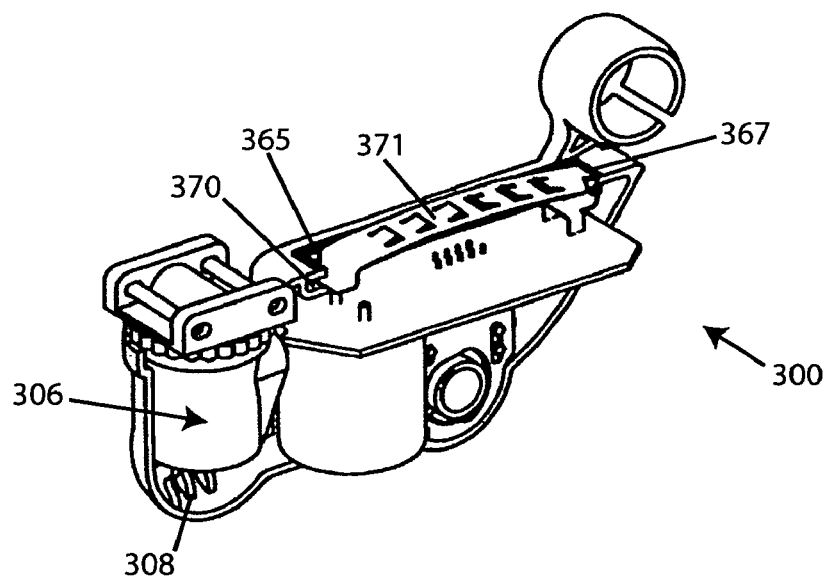
FIG. 38 is a perspective view of the brake cartridge shown in FIG. 34 with the brake pawl removed for clarity.

The interior of brake cartridge 300 is shown in FIGS. 36 through 38, including an actuator 306. The actuator is shown positioned in the cartridge similarly to actuator 150 described above. Ribs, such as ribs 308, are shown in the housing to support the actuator and to provide strength to the housing, as discussed above.

Figure 39:
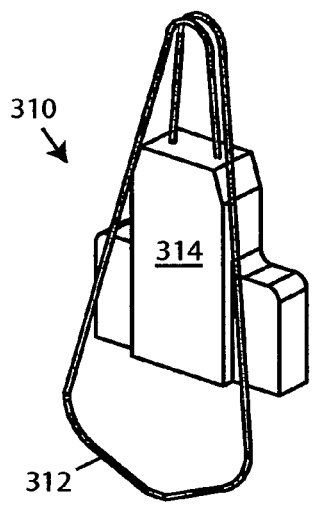
FIG. 39 is a perspective view of a fuse wire assembly, with the fuse wire bent as it would be when installed in a brake cartridge.
Figure 40:
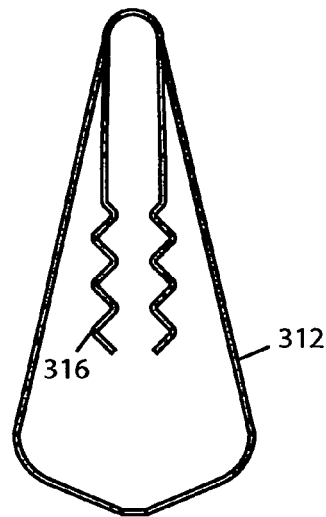
FIG. 40 shows the fuse wire of FIG. 39 without the anchor.

FIG. 39 shows a fuse wire assembly 310 used in actuator 306. Fuse wire assembly 310 includes a fuse wire 312 insert-molded into an anchor 314. Fuse wire 312 is shown twisted and down, as if it were wrapped over the lever pin and around the shoulders on the spring housing. FIG. 40 shows fuse wire 312 without anchor 314 so that the ends of the wire are visible. Each end of the fuse wire includes bends 316 that help prevent the wire from pulling out of the anchor.

Figure 44:
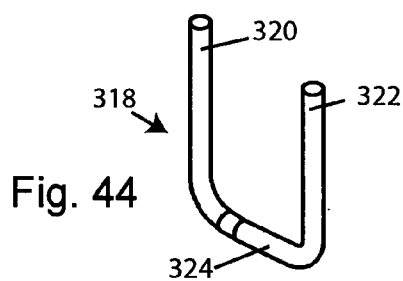
FIG. 44 is a perspective view of an electrode used in the brake cartridge of FIG. 34.
Figure 45:
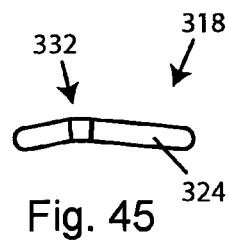
FIG. 45 is another view of the electrode shown in FIG. 44.

Fuse wire 312 is configured to extend over two electrodes on a circuit board so that a surge of electricity can be sent from one electrode to the other through the fuse wire to break the wire, as described above. An electrode used in actuator 306 is shown at 318 in FIGS. 44 and 45. Electrode 318 is a "U" shaped piece of wire with two ends 320 and 322 that are soldered onto the circuit board. A section 324 extends between ends 320 and 322.

Figure 41:
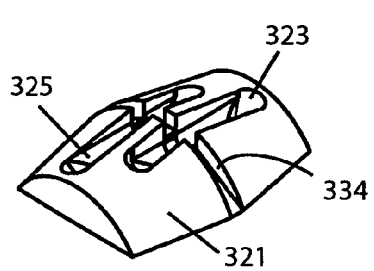
FIG. 41 shows an electrode isolator used in the brake cartridge of FIG. 34.
Figure 42:
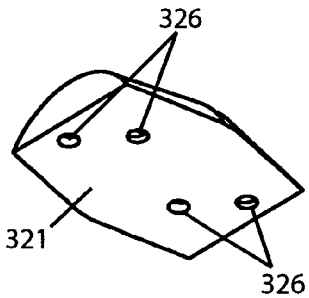
FIG. 42 is another view of the electrode isolator shown in FIG. 41.
Figure 43:
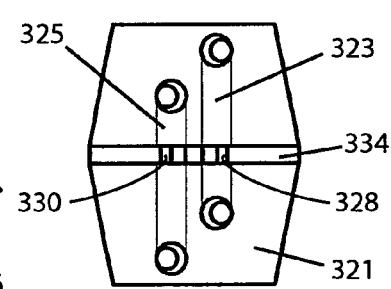
FIG. 43 is still another view of the electrode isolator shown in FIG. 41.

It is important that the fuse wire contact both electrodes. However, if one electrode is soldered on the circuit board higher than the other, then the fuse wire may touch only one electrode. Also, because the electrodes are positioned close to each other on the circuit board, it is also conceivable that the fuse wires may touch or become electrically connected and allow current to pass from one to the other without breaking the fuse wire. Brake cartridge 300 includes a fuse wire isolator to address these issues. A fuse wire isolator 320 is shown in FIGS. 41 through 43.

Fuse wire isolator 320 is a small molded part having two channels 322 and 324. The channels terminate in holes 326. The electrodes fit into the channels, and the ends of the electrodes extend through the holes to the circuit board. The channels are configured with sloping side surfaces so that the electrodes are directed into predetermined positions when the electrodes are inserted into the channels. Two sloping surfaces are shown at 328 and 330 in FIG. 43. The sloping surfaces create a slight bend in the electrodes, as shown at 332 in FIG. 45. The electrodes may be pre-bent to fit into the channels, or the channels themselves may cause the electrodes to bend. Also, each of holes 326 have one side that is vertical relative to the bottom of the electrode isolator, and another side that is sloped so that the holes are somewhat cone shaped. The somewhat conical-shaped holes make it easier to insert the electrodes into the holes, and help to direct the electrodes into the proper position, while the narrower terminus of each hole tends to hold the electrode in place. Channels 322 and 324 are also offset from each other, as shown in FIG. 43. When the electrodes are soldered onto the circuit board, the solder will typically extend outward from the electrodes. If the electrodes are positioned too closely, then the solder surrounding one electrode may touch and electrically connect to the solder surrounding another electrode, which could prevent the electrodes from passing current through the fuse wire. Offsetting the electrodes as shown in FIG. 43 permits the electrodes to be positioned closer together than they otherwise could be because the solder pads will be offset.

The fuse wire isolator also includes a slot 334 extending transversely across channels 322 and 324. Fuse wire 312 fits into slot 334, and slot 334 directs the fuse wire across the electrodes. The fuse wire isolator, including slot 334, is shaped to hold the electrodes in positions where the fuse wire must contact and extend over both electrodes. The fuse wire isolator may be thought of as creating a path over the electrodes for the fuse wire to follow.

FIG. 46 shows fuse wire isolator 320 mounted on the bottom of a circuit board with fuse wire 312 extending across the electrodes. Several components from actuator 306 have been removed to show the fuse wire isolator clearly.

Figure 47:
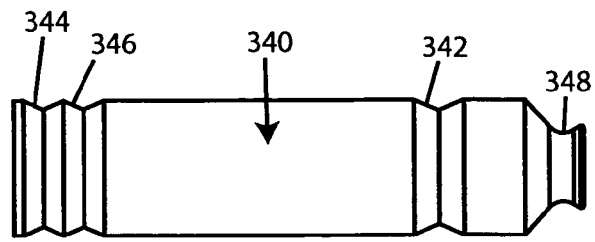
FIG. 47 shows a lever pin used in the brake cartridge of FIG. 34.

FIG. 47 shows a lever pin 340 used in actuator 306. Lever pin 340 includes a notch 342 for the fulcrum, notches 344 and 346 for the fuse wire, and notch 348 for the link assembly. Notch 348 in lever pin 340 is more rounded than corresponding notch 184 in lever pin 170 shown in FIG. 20. The more rounded notch accommodates the alternative link assembly discussed below.

Figure 48:
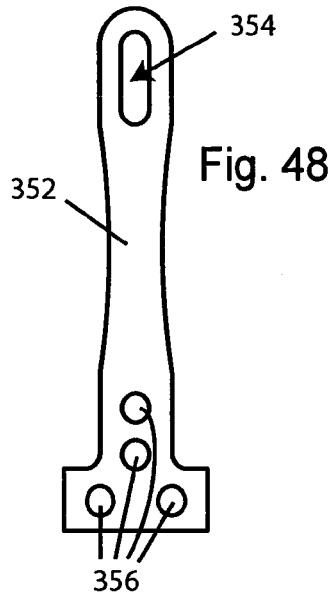
FIG. 48 shows a link used in the brake cartridge of FIG. 34.
Figure 49:
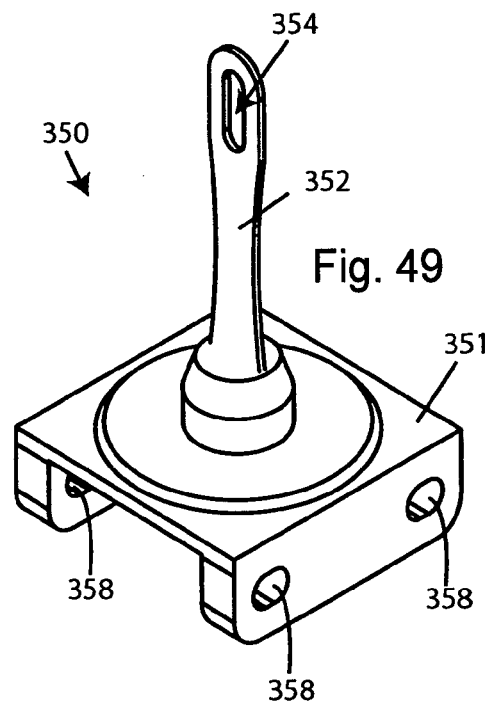
FIG. 49 shows a link assembly used in the brake cartridge of FIG. 34.
Figure 50:
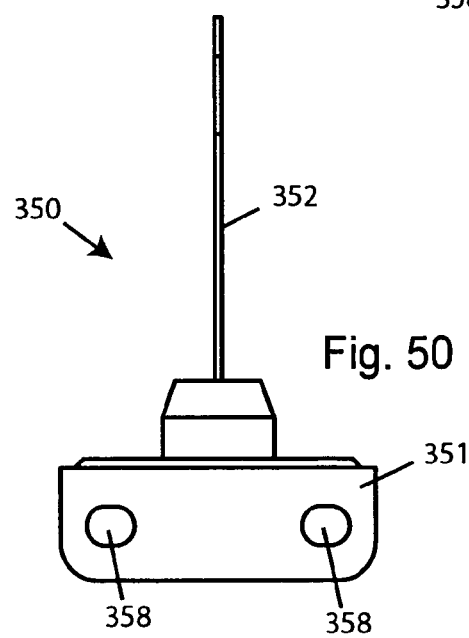
FIG. 50 shows a side view of the link assembly in FIG. 49.

FIGS. 49 and 50 show a link assembly 350 used in actuator 306. Link assembly 350 includes a link 352 insert molded into a base 351. Link 352 is a thin, stamped metal part, and is shown isolated in FIG. 48. The material from which the link is made should be sufficiently strong to withstand the tension and force of the spring when the actuator is assembled. One possible material is 20% cold worked steel or stainless steel. The link includes an aperture 354 that fits over notch 348 on the lever pin. Using a stamped metal link 352 instead of a link wire avoids the issue of bending the wire into an inverted "U"

shape, which may weaken or even crack the wire at the bend. Link 352 also includes holes 356 that are buried in base 351 during molding. The material forming the base flows into holes 356 during molding; thereby minimizing the chance that link 352 will pull out of the base. Base 351 includes holes 358 through which pins or screws are inserted to join the base to the brake pawl, as described above. Holes 358 are somewhat oval shaped to allow for some lateral movement of the base relative to the brake pawl. Lateral movement may result from plastic or thermoset parts such as base 351 expanding or contracting at rates different from the aluminum brake pawl.

FIG. 51 shows a top view of actuator 306. Lever pin 340 is balanced on a fulcrum with link 352 over one end of the lever and fuse wire 312 over the other end of the link. FIG. 52 is a cross-section side view of assembled actuator 306 taken along the line A-A in FIG. 51. FIG. 52 shows how the various components fit and work together to form the actuator.

Figure 53:
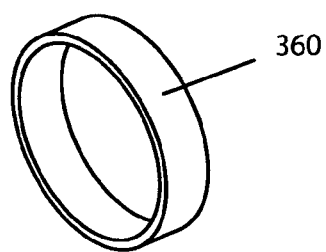
FIG. 53 shows a foam washer that may be used in the brake cartridge shown in FIG. 34.

FIG. 53 shows a foam washer 360 that may be placed around the capacitor in the cartridge. The foam washer shields the capacitor and dampens any vibrations that may adversely affect the capacitor.

Figure 54:
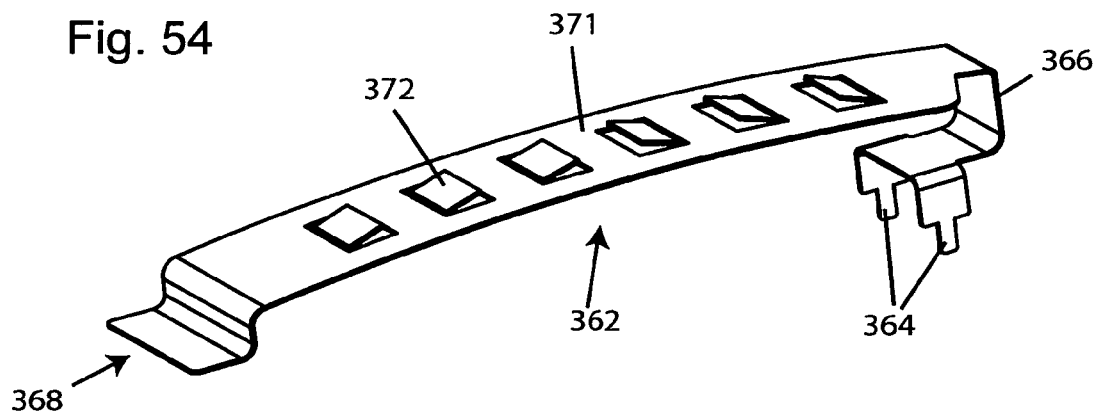
FIG. 54 shows an electrode that is used to detect blade-to-pawl spacing in the brake cartridge shown in FIG. 34.

FIG. 54 shows an electrode 362 used in brake cartridge 300 to detect whether the spacing between the blade and brake pawl is appropriate. If the spacing is too great, then a more severe injury could result because it would take longer to move the brake pawl into the blade to stop the blade. Also, a user may install a blade in the saw for which the brake cartridge is not designed. For example, a user may inadvertently install an 8-inch blade in a saw that has a brake cartridge designed for a 10-inch blade. In that case, the brake pawl may not be able to reach the blade if an accident occurs. Checking the blade-to-pawl spacing, and allowing the saw to function only if the spacing is within acceptable limits, addresses these issues.

Figure 55:
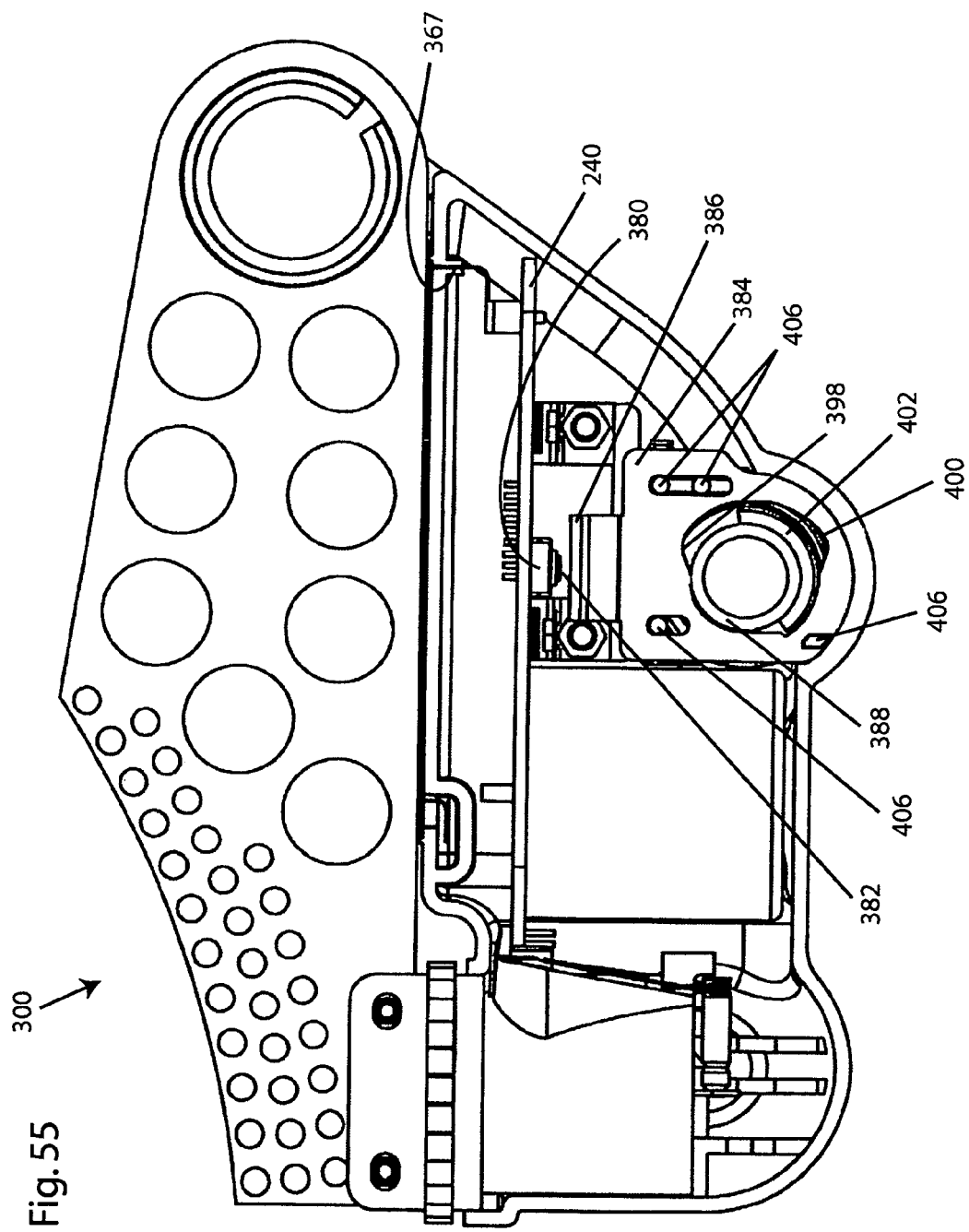
FIG. 55 shows an enlarged side view of a brake cartridge with a switch contactor and cam bushing.

FIGS. 37 and 38 show electrode 362 mounted in cartridge 300. Electrode 362 includes two tabs 364 that are soldered onto the circuit board used in the cartridge. A portion 366 extends up and away from tabs 364 and is dimensioned so that it can pass through slot 367 in the housing, as shown in FIGS. 37 and 38. Slot 367 may include flanges extending into the cartridge to create a slot longer than the wall thickness of the cartridge housing (as shown in FIG. 55). A longer slot provides a better dust seal around portion 366. The housing of the cartridge includes an outwardly extending flange 365 that extends around electrode 362 to protect the electrode and to provide more of a labyrinth seal to prevent dust from entering the cartridge through slot 367.

The end of the electrode opposite portion 366 includes a folded tab 368 that fits into socket 370 in the housing. A section 370 of the electrode extends between portion 366 and tab 368 outside of the cartridge and between the housing and the brake pawl, as shown. Section 370 is slightly arched to insure it touches the brake pawl when the brake pawl and housing are joined. Section 370 also includes raised tabs 372 that extend up to contact the brake pawl. When the brake pawl and housing are joined, the tabs will contact the pawl and scrap along the pawl as the pawl pushes the tabs and section 370 down toward the housing, thereby helping to ensure contact between the electrode and the pawl.

To assemble the cartridge, electrode 362 is soldered to the circuit board and then the entire circuit board and actuator are placed in one half of the cartridge housing by sliding the electrode into slot 367 and socket 370. The other half of the cartridge then closes socket 370 and slot 367, trapping the electrode in place.

Electrode 362 electrically connects the brake pawl to the electronics in the brake cartridge. That connection, in turn, permits the brake pawl to act as a sensor to detect whether the blade is within a specified distance. As explained above, and as explained in the documents incorporated by reference, an electrical signal is placed on the blade and used by the detection subsystem to detect when a person contacts the blade. That same signal will induce a corresponding signal on the brake pawl because the perimeter of the blade and the surface of the brake pawl will create a capacitive coupling. In other words, the signal on the blade will capacitively induce a signal on the brake pawl. The signal on the brake pawl can then be measured to determine whether the blade is sufficiently close to the pawl. Additional information about detecting blade-to-pawl spacing is set forth in the documents incorporated by reference.

FIG. 55 shows a small tactile switch 380 mounted on circuit board 240 in brake cartridge 300. The switch includes a button 382 that is pressed and released to toggle the switch. Switch 380 is used to signal the control subsystem that the brake cartridge is fully installed in the saw. If the cartridge is not fully installed in the saw, the saw will not run.

Figures 56, 57, 58:
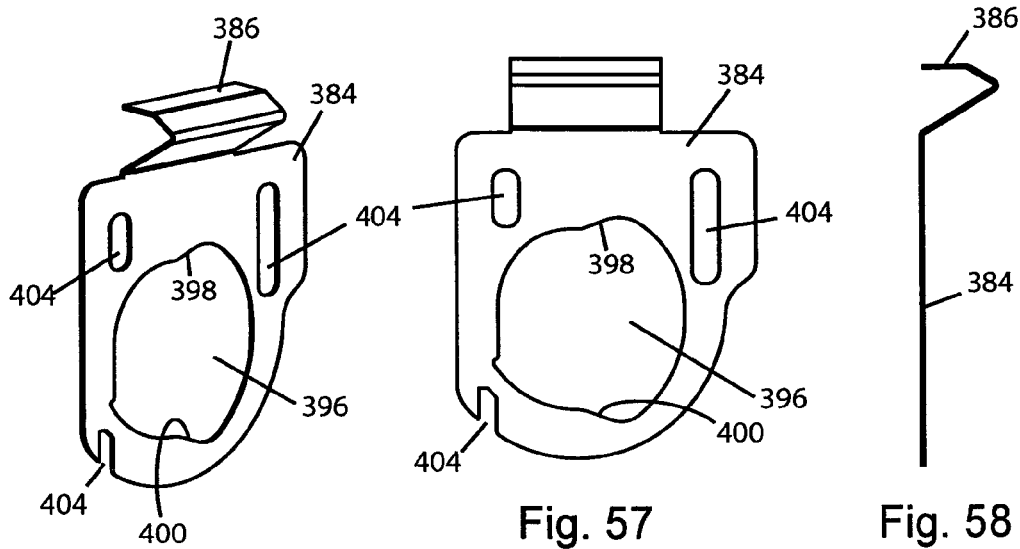
FIG. 56 shows a perspective view of a switch contactor.
FIG. 57 shows a front elevation view of the switch contactor of FIG. 56.
FIG. 58 shows a side elevation view of the switch contactor of FIG. 56.

A switch contactor 384 is positioned adjacent switch and is designed to move up and down, into and out of contact with button 382. Switch contactor 384 is made from a thin piece of sheet metal, and is shown isolated in FIGS. 56 through 58. The switch contactor includes a folded tab 386, as shown. Tab 386 is the part of the switch contactor that actually contacts button 382. Tab 386 is folded to help insure contact is made with button 382, and also to apply a somewhat predetermined and controlled force to the button. The tab will flex when it contacts button 382 and will prevent too much force from being applied to button 382. When flexed, the tab will also urge the spring contactor away from button 382.

Figures 59, 60:
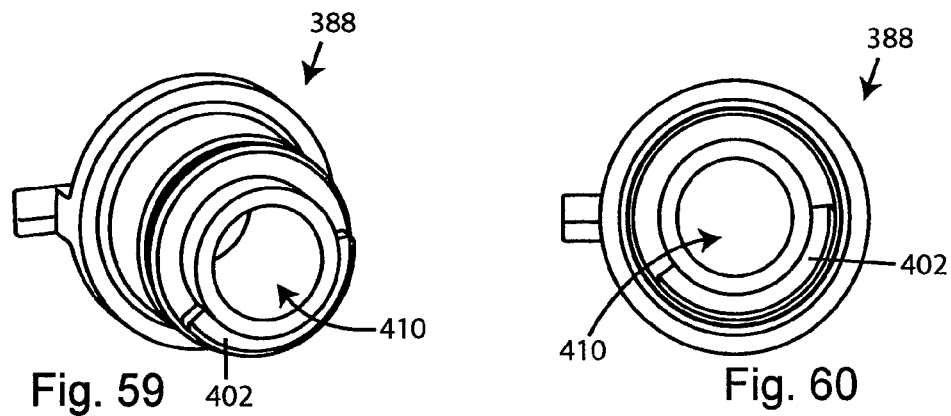
FIG. 59 shows a perspective view of a cam bushing.
FIG. 60 shows a front elevation view of the cam bushing of FIG. 59.
Figure 61:
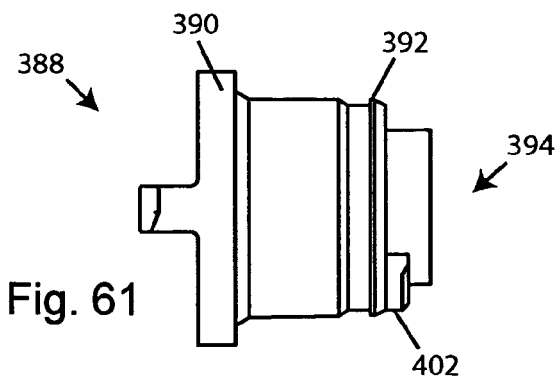
FIG. 61 shows a side elevation view of the cam bushing of FIG. 59.
Figure 82:
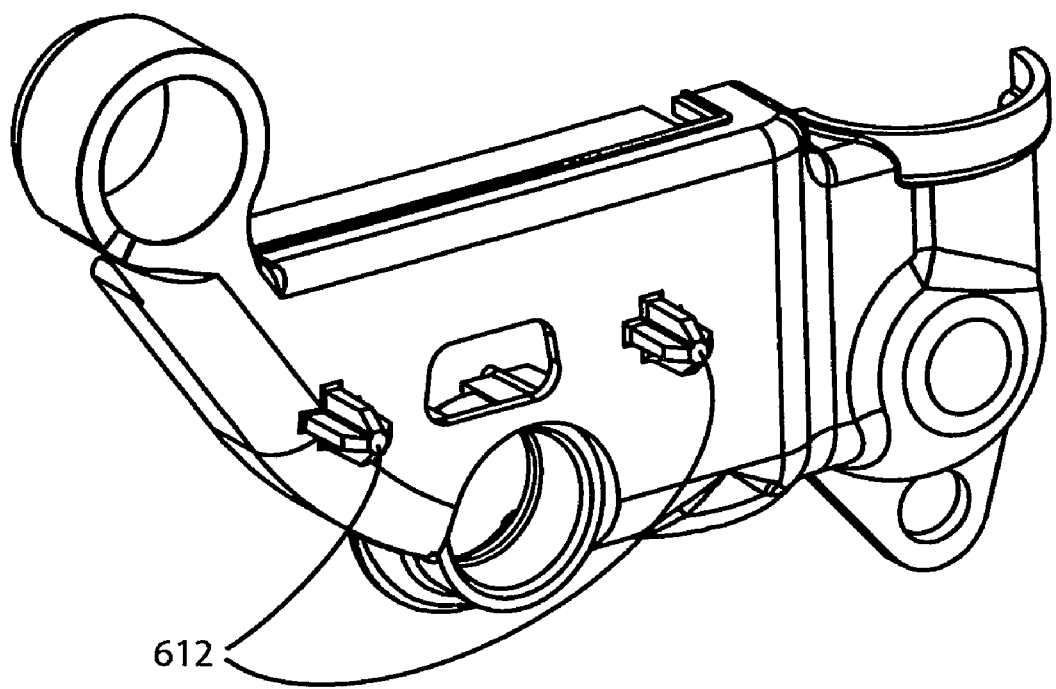
FIG. 82 shows half of a cartridge housing isolated from other structure.

Switch contactor 384 is mounted on a cam bushing 388. Cam bushing 388 is a somewhat cylindrical part, shown isolated in FIGS. 59 through 61. Cam bushing 388 includes an annular outer flange 390, and an annular snap-ring 392 distal from flange 390. The cam bushing is mounted in a bore in the housing of the brake cartridge, as shown in FIGS. 34 and 35. The bore in the housing is shown in FIG. 82. The cam bushing is pushed into the bore until flange 390 abuts the outer surface of the housing and snap-ring flange 392 snaps over a corresponding shoulder in the bore. When installed, the cam bushing may rotate in the bore around its longitudinal axis.

The cam bushing includes an end 394 that extends into the brake cartridge and on which switch contactor 384 is mounted. Switch contactor 384 includes an aperture 396 that fits over end 394 of the cam bushing. The periphery of aperture 396 includes cam surfaces 398 and 400. A flange 402 on end 394 of the cam bushing is designed to contact the cam surfaces.

When cam bushing 388 rotates counterclockwise, as seen in FIG. 55, flange 402 will rotate without causing the spring contactor to move until flange 402 contacts cam surface 398. As flange 402 contacts cam surface 398 and continues to rotate, flange 402 will slide over the cam surface and cause the switch contactor to move into contact with switch 380. Switch contactor 384 includes apertures 404 (labeled in FIGS. 56 and 57), which are shaped to fit around pins 406 in the housing. The apertures are oval shaped so that the switch contactor may move up and down, into and out of contact with switch 380, but not side-to-side. Apertures 404 and pins 406 are positioned around the switch contactor to support the contactor as it moves. The switch contactor is held on the pins, and on cam bushing 388, by the other half of the cartridge housing. When cam bushing 388 rotates clockwise, as seen in FIG. 55, flange 402 will contact and slide along cam surface 400, causing switch contactor 384 to move out of contact with switch 380. In this manner, the switch contactor and cam bushing provide a simple mechanism to convert the rotary movement of the cam bushing into translational motion of the switch contactor. A stop may be incorporated on the cam bushing to limit the distance the bushing rotates.

Cam bushing 388 includes a central bore 410. It is intended that cam bushing 388 be rotated with a pin or key that extends into central bore 410, and that the key help secure the cartridge to a bracket in the saw.

Figure 73:
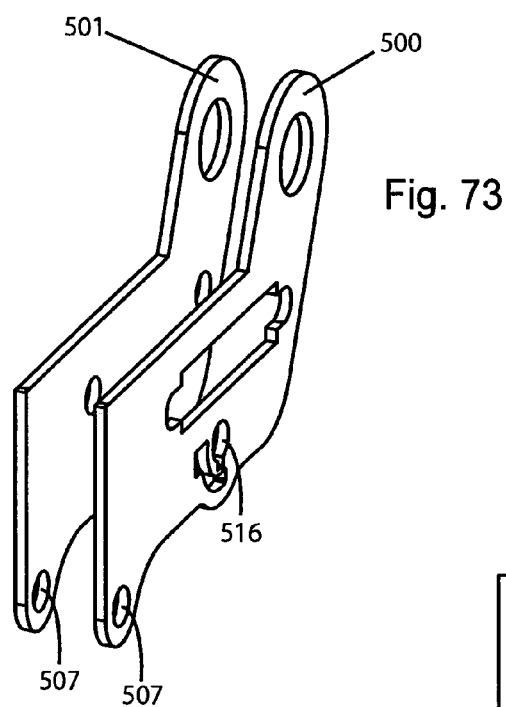
FIG. 73 shows two bracket plates.

FIGS. 65 through 68 show various views of a cartridge 301 mounted on a first bracket plate 500, which, in turn, is associated with a second bracket plate 501. The bracket plates are shown isolated in FIGS. 73 through 75. Bracket plates 500 and 501 are mounted on pin 503 adjacent arbor block 502. The bracket plates are spaced apart by spacer 505.

Figure 69:
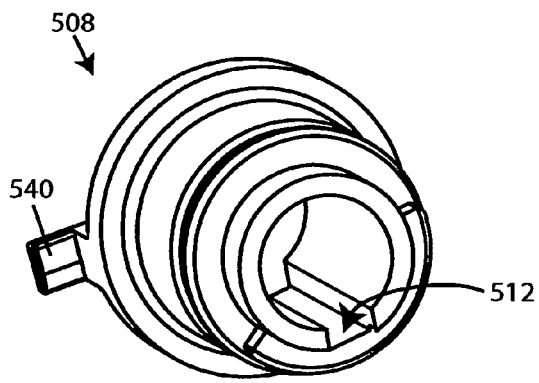
FIG. 69 shows a perspective view of a cam bushing.
Figure 70:
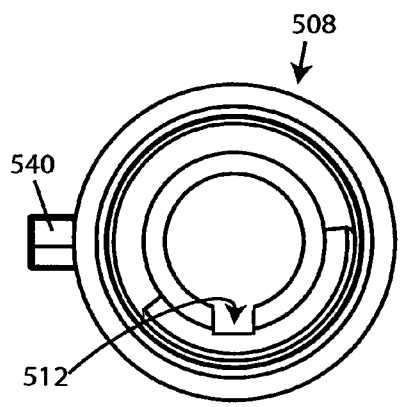
FIG. 70 shows a front elevation view of the cam bushing in FIG. 69.

Cartridge 301 is similar to cartridge 300 described above, except that cartridge 301 includes a tab 504 that fits around a shaft 506 extending through holes 507 in bracket plates 500 and 501. Cartridge 301 also includes a slightly modified cam bushing 508 shown in FIGS. 69 and 70, and a key 510 that extends through the central bore in the bushing to turn the bushing and secure the cartridge to the two bracket plates. The key is shown isolated in FIGS. 71 and 72. Cam bushing 508 is similar to cam bushing 388 described above, except that cam bushing 508 includes an internal key slot 512. Key 510 includes a ridge 514 that fits in slot 512 in the bushing. Slot 512 allows key 510 to be inserted in only one orientation.

Figure 74:
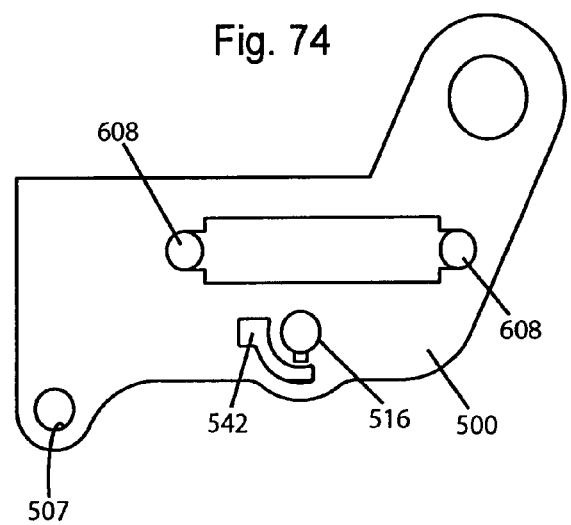
FIG. 74 is a right side elevation view of the bracket plates in FIG. 73.
Figure 75:
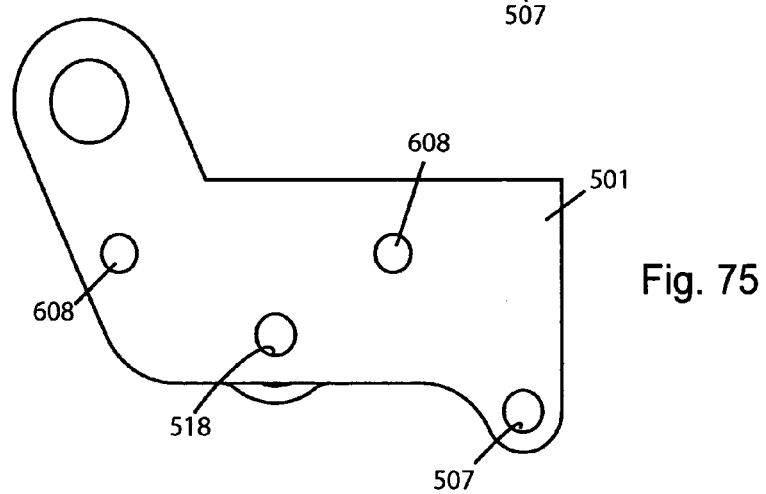
FIG. 75 is a left side elevation view of the bracket plates in FIG. 73.
Figure 76:
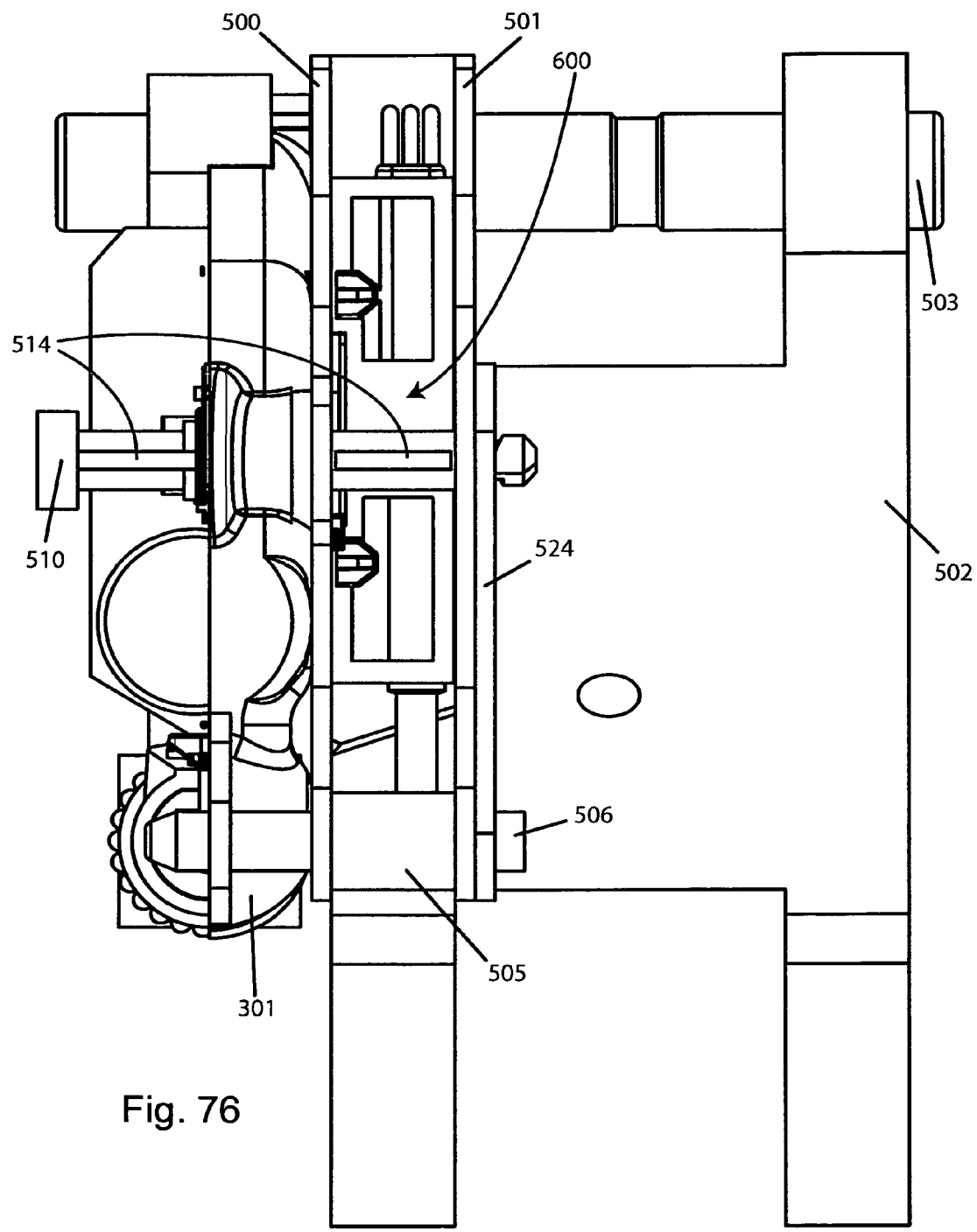
FIG. 76 is a bottom elevation view of the brake cartridge and other structure shown in FIG. 65, with part of the cartridge housing removed.

Cartridge 301 is mounted in the saw on brackets 500 and 501 by inserting key 510 through cam bushing 508 and through apertures 516 and 518 in bracket plates 500 and 501, respectively. Hole 516 is shaped to accommodate ridge 514, as shown in FIG. 74. Ridge 514 on key 510 includes slots 520 and 522 that are positioned so that when key 510 is inserted all the way into the bushing, the slots will align with the bracket plates. The key can then be turned to lock the cartridge to the bracket plates. FIG. 76, which shows a bottom view of the cartridge installed on bracket plates 500 and 501 with part of the cartridge housing removed, shows key 510 inserted through cam bushing 508 and bracket plates 500 and 501.

Figure 77:
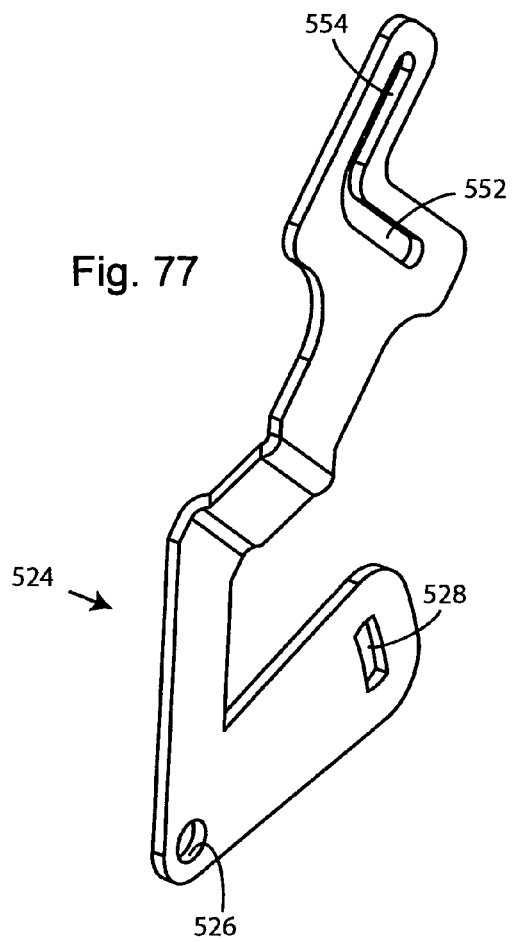
FIG. 77 shows an arbor link.
Figure 78:
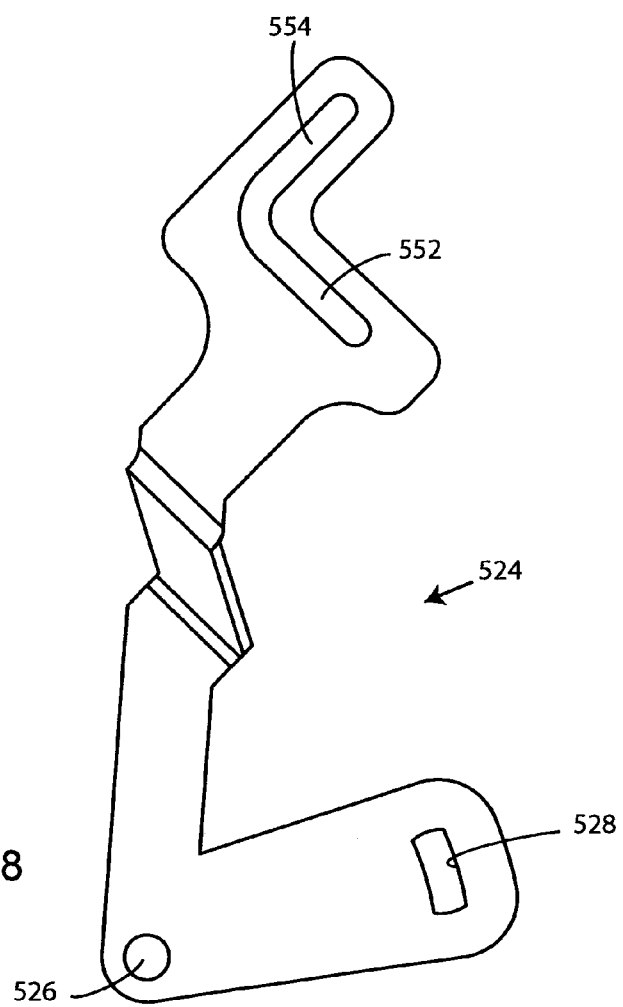
FIG. 78 shows another view of the arbor link of FIG. 77.

Bracket plates 500 and 501 are connected to arbor 502 by an arbor link 524. The arbor link is shown with other components in FIGS. 65 through 68, and is shown isolated in FIGS. 77 through 78. Arbor link 524 is connected to bracket plate 501 by aperture 526 sliding on pin 506, as shown.

Figure 71:
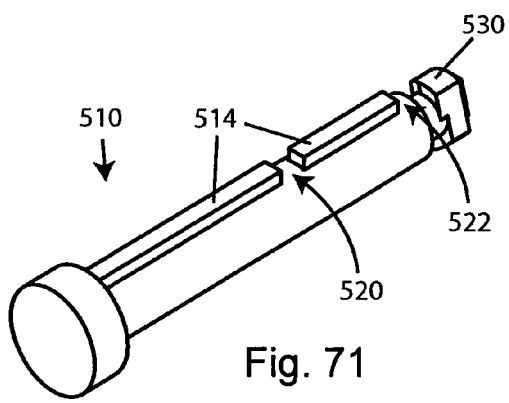
FIG. 71 shows a perspective view of a key.
Figure 72:
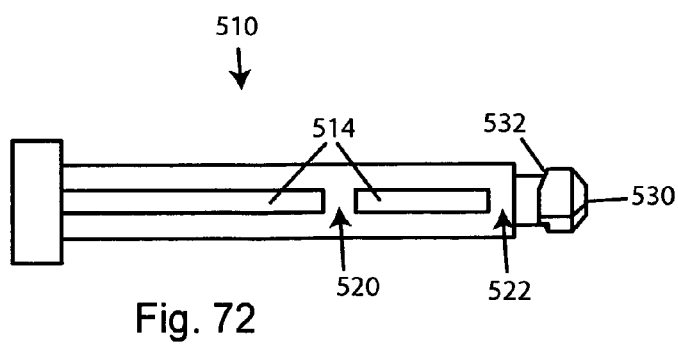
FIG. 72 shows an elevation view of the key in FIG. 71.

Arbor link 524 includes an elongate aperture 528 configured to receive end 530 of key 510. End 530 is shaped to fit through aperture 528 when the key is inserted through the cam bushing and bracket plates. End 530 is also tabbed, as shown in FIGS. 71 and 72, so that when the key is turned, the tabs lock the key in place over aperture 528 and prevent the key from being retracted. The tabs on end 530 include sloped surfaces 532 to facilitate turning of the key. The length of the key is chosen and the tabs on end 530 are configured so that when the key is fully inserted, turning the key pulls the cartridge, bracket plates and arbor link together.

Additionally, when key 510 is turned, ridge 514 causes cam bushing 508 to turn, which then causes the switch contactor in the cartridge to press a tactile switch such as switch 380 to indicate the cartridge is in place, as described above.

Cam bushing 508 also includes a tab 540 that is positioned on the outer flange of the bushing and that remains outside the cartridge. An aperture 542 is positioned in bracket plate 500 so that the cartridge cannot be mounted on the bracket plate unless tab 540 aligns with aperture 542, and tab 540 cannot align with tab 540 unless the cam bushing is oriented so that the slide contactor in the cartridge is up, out of engagement with the tactile switch in the cartridge. In this manner, the cartridge can only be installed if the tactile switch in the cartridge is off. A user then must insert and turn key 510 to both lock the cartridge in place and press the tactile switch to signal that the cartridge is properly installed. This prevents the saw from being used when the cartridge is not properly installed in the saw. Aperture 542 is shaped to receive tab 540, and to allow tab 540 to turn when key 510 turns cam bushing 508.

Figure 65:
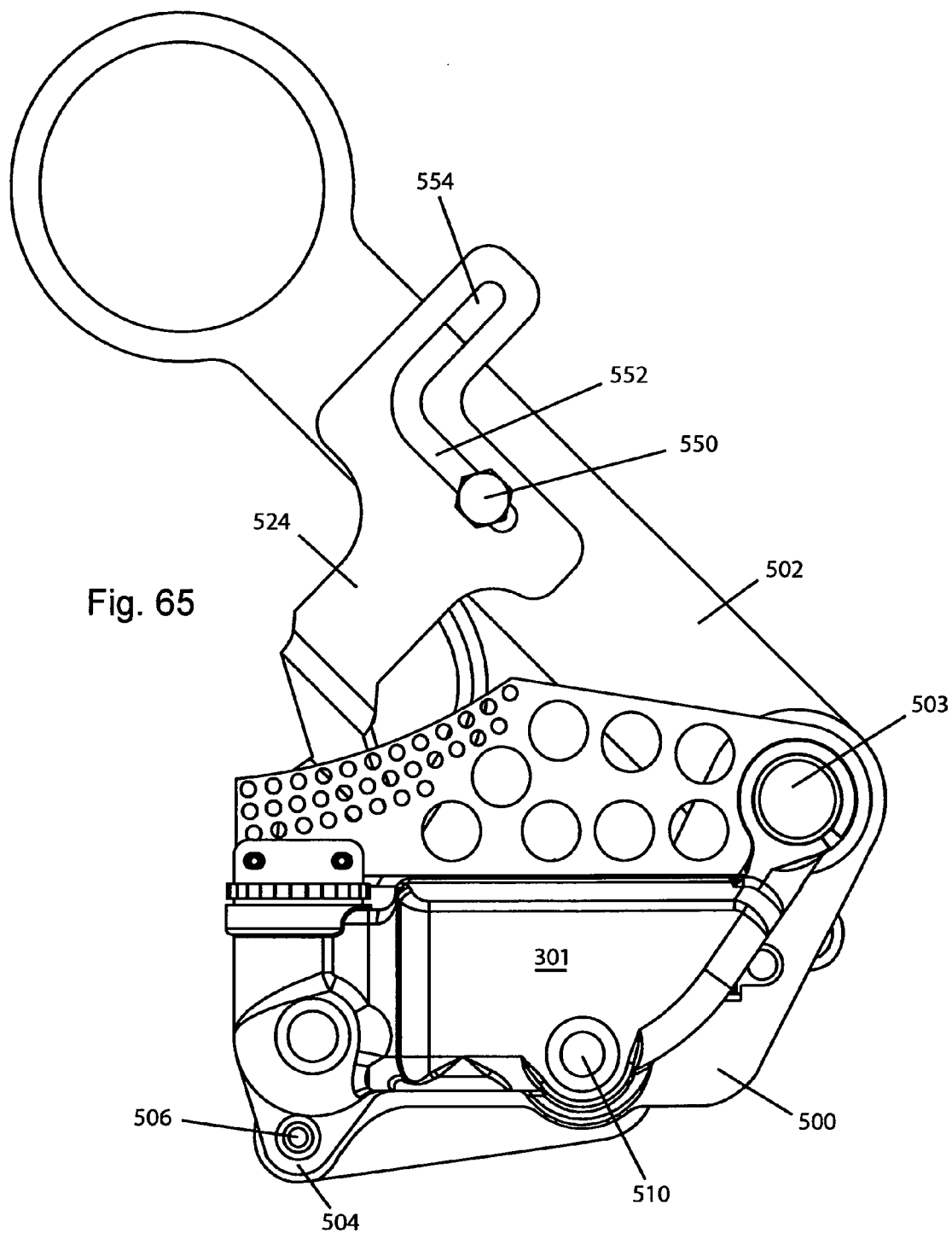
FIG. 65 shows a right side elevation view of a brake cartridge mounted on bracket plates and connected to an arbor block.
Figure 66:
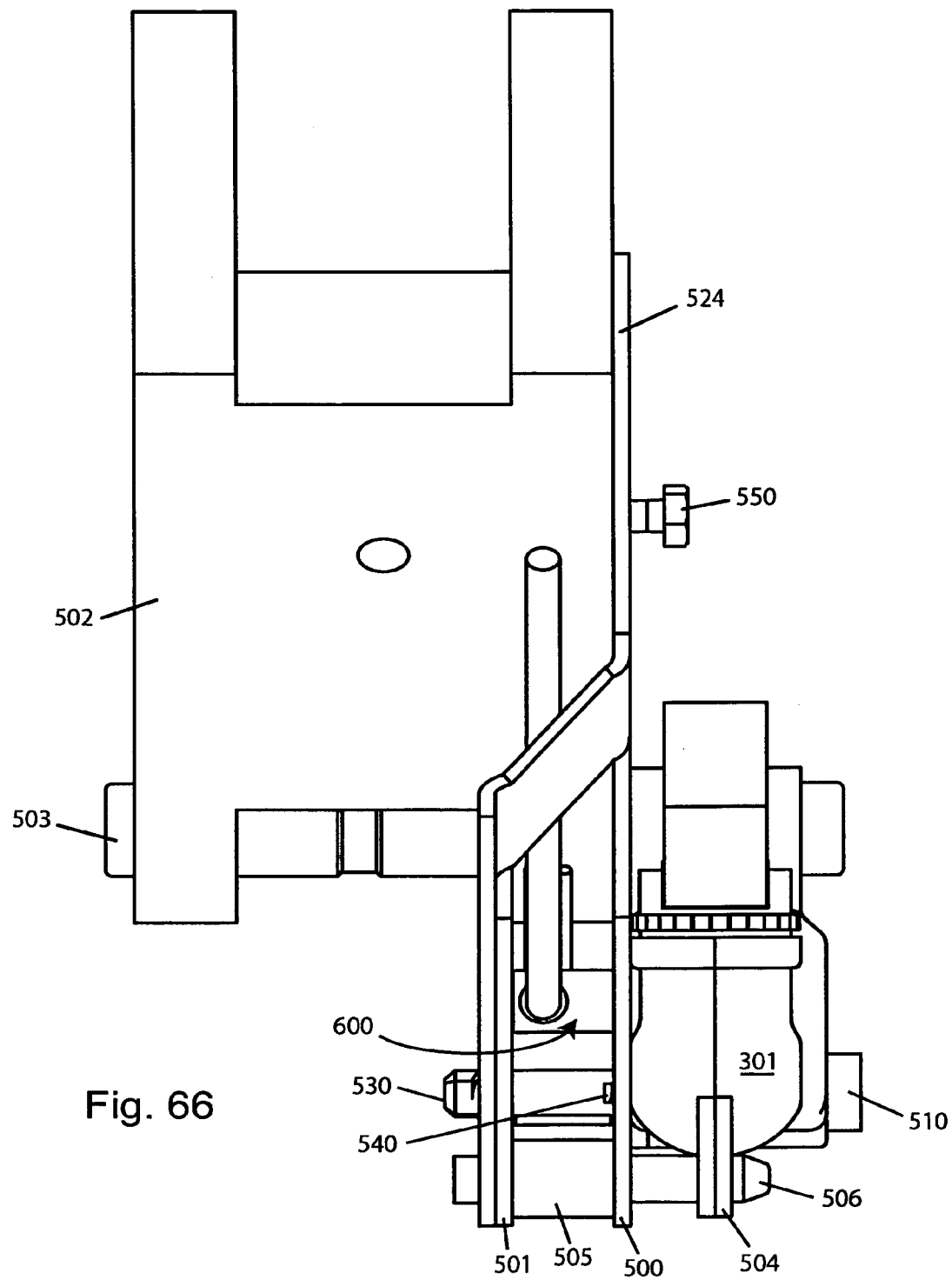
FIG. 66 shows a front elevation view of the structure shown in FIG. 65.
Figure 67:
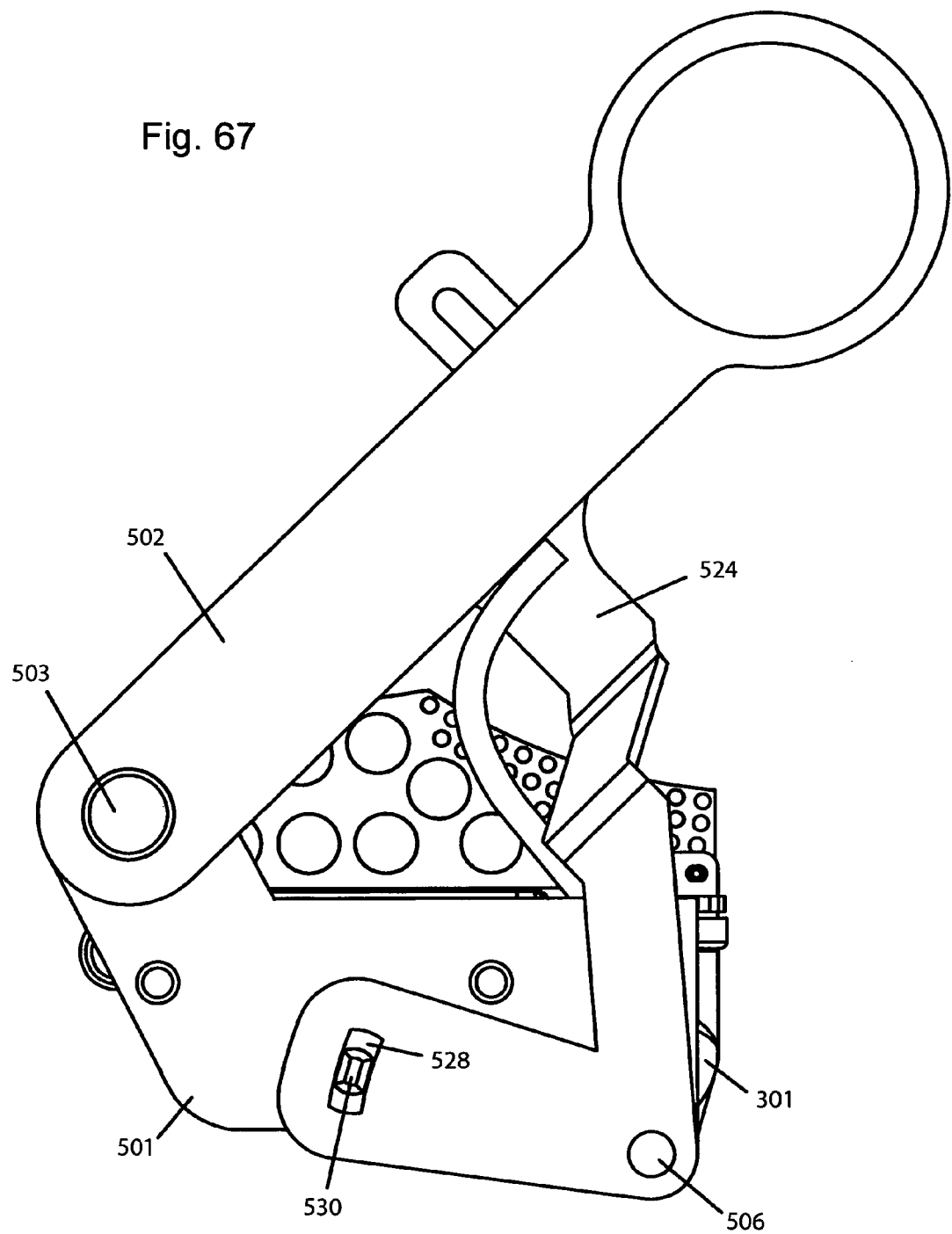
FIG. 67 shows a left side elevation view of the structure shown in FIG. 65.
Figure 68:
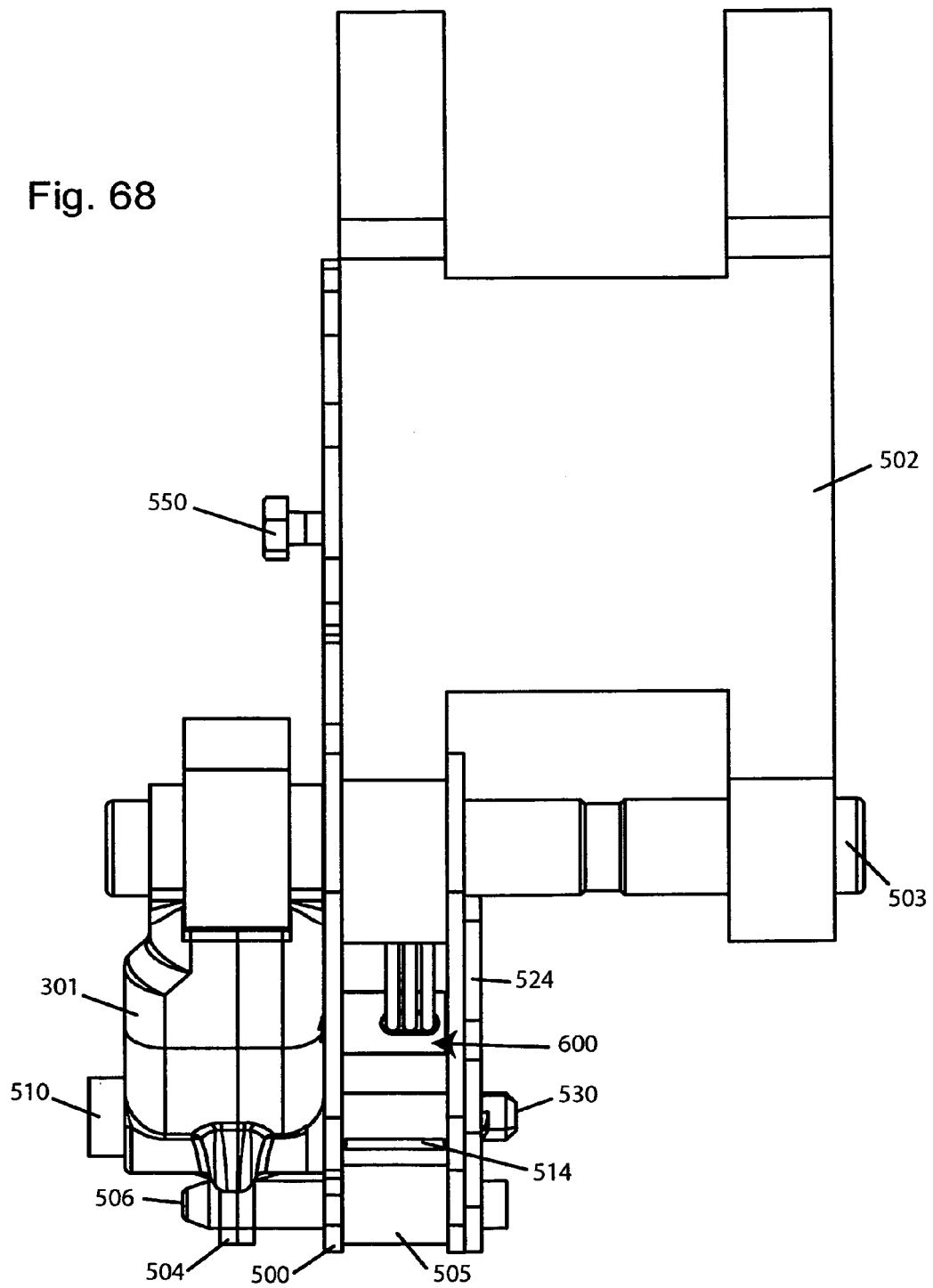
FIG. 68 shows a back elevation view of the structure shown in FIG. 65.

Arbor link 524 is connected to arbor block 502 by a bolt 550 that extends through a slot 552 in the arbor link and threads into a hole in the arbor block, as shown in FIG. 65. When bolt 550 is loose, moving the arbor link will cause the bracket plates and cartridge to move toward or away from a blade mounted in the saw. In this manner, the position of the cartridge relative to the perimeter of the blade can be adjusted to account for slight variances in the size of blades. However, that adjustment is limited by aperture 528 and key 510. Key 510 will not align with aperture 528 if the arbor link is moved too much, so the cartridge can be installed only if the arbor link is within an acceptable range of positions. When the arbor link and cartridge are properly positioned relative to the blade, bolt 550 is tightened to hold the arbor link in place.

Arbor link 524 also includes a slot 554 that is joined to slot 522. Slot 524 allows the arbor link and cartridge to move so that any residual pressure from the spring on the brake pawl after the cartridge has fired can be released. As explained above, when the cartridge fires, the blade cuts into the brake pawl and stops. However, the spring in the cartridge may not be fully expanded so there may be residual spring force pushing the pawl onto the blade. That force should be released before the brake pawl can be knocked off the blade and the spent cartridge replaced.

After the cartridge has fired, key 510 would be withdrawn from the cam bushing and bracket plates to allow the arbor link to move freely. Bolt 550 would be loosened and arbor link 524 would be moved so that bolt 550 slides up into slot 554. The cartridge would then move away from the blade, releasing any residual spring force. The brake pawl can then be knocked off the blade and the spent cartridge replaced.

FIGS. 79 through 81 show a plug 600 to which the cartridge connects when the cartridge is installed in the saw. Plug 600 includes a female D-sub connector 602 that corresponds to the male D-sub connector in cartridge 301. A plastic casing 604 is molded over and around connector 602. Casing 604 includes four posts 606 that are designed to fit into corresponding holes 608 in bracket plates 500 and 501. Casing 604 is positioned between bracket plates 500 and 501 and held in place by the posts and holes. The posts are sized so that they are somewhat smaller than the holes so that the plug may move slightly to align itself with the corresponding plug on the cartridge. Casing 604 also includes two sockets 610 configured to accept projections 612 on the cartridge housing. Projections 612 are shown in FIG. 82 projecting out from one half of the cartridge housing. Projections 612 align plug 600 with the corresponding plug on the cartridge as the cartridge is installed in the saw. Plug 600 also includes three cords 614 which connect to the two arbor electrodes in the detection subsystem and to ground. Plug 600 also includes a cord 616 that connects to the switch box for the saw.

Cartridge 300 is sized somewhat wider and taller than cartridge 100, as shown in FIGS. 34, 55, 66 and 68, in order to accommodate more electronics and a larger printed circuit board. Essentially all of the electronics for the saw are included on the circuit board in cartridge 300, including the electronics for the detection subsystem, the control subsystem, blade-to-pawl spacing, the firing circuit, etc. Placing all or substantially all of the electronics in the cartridge provides the significant advantage of being able to update the electronics easily by simply replacing an old cartridge with a new one. For example, the control subsystem in the saw will typically include a microprocessor controlled by software, as described in the documents incorporated by reference, and if that microprocessor or software is ever updated, then the new microprocessor or software can be implemented in existing saws by simply installing a new brake cartridge. The electronics in the cartridge will automatically connect to the power source, on/off switch or switches, arbor electrodes, and other such items, when the cartridge is plugged in. Placing all or substantially all the electronics in the cartridge also minimizes the number of electrical connections and cords required in the saw. It also keeps the detection electronics near the electrodes to, thereby making the system less susceptible to noise. Placing the electronics together in the cartridge also facilitates implementing the electronics as an application specific integrated circuit because all of the electronics will be located in one place.

INDUSTRIAL APPLICABILITY

The systems, components and brake cartridges disclosed herein are applicable to power equipment, and specifically to woodworking equipment such as saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A brake cartridge for use in safety systems for power tools, the cartridge comprising:
    a housing;
    a system to perform a predetermined action, where at least part of the system is enclosed within the housing;
    circuitry enclosed in the housing and adapted to trigger the system;
    switch means enclosed in the housing and operably associated with the circuitry for indicating through activation of the switch means that the cartridge is properly installed in a power tool; and
    switch contactor means enclosed in the housing for activating the switch means when the cartridge is properly installed in the power tool.

2. A brake cartridge for use in safety systems for power tools, the cartridge comprising:
    a housing;
    a brake pawl associated with the housing and adapted to pivot relative to the housing;
    a spring at least partially enclosed in the housing and adapted to pivot the brake pawl relative to the housing when the spring expands;
    a fuse wire adapted to hold the spring in compression;
    circuitry enclosed in the housing and adapted to fuse the fuse wire to release the spring;
    a plug associated with the housing and adapted to engage a corresponding plug in the power tool;
    switch means enclosed in the housing for indicating the cartridge is properly installed when the switch means is activated, where the switch means is configured to be activated through contact; and
    switch contactor means enclosed in the housing for contacting and activating the switch means when the cartridge is properly installed in the power tool.

3. The brake cartridge of claim 2, further comprising aperture means for receiving a rotatable key, where rotation of the key causes the switch contactor means to contact and activate the switch means.

4. The brake cartridge of claim 3, where the aperture means is configured to allow the key to rotate to cause the switch contactor means to contact and activate the switch means only when the cartridge is properly installed in the power tool.

* * * * *